US011762921B2

(12) United States Patent
Benincasa et al.

(10) Patent No.: US 11,762,921 B2
(45) Date of Patent: Sep. 19, 2023

(54) TRAINING AND APPLYING STRUCTURED DATA EXTRACTION MODELS

(71) Applicant: EIGEN TECHNOLOGIES LTD, London (GB)

(72) Inventors: Gregorio Benincasa, London (GB); Andrea Schiavi, London (GB); Huiting Liu, London (GB); Tom Bird, London (GB); Uwais Iqbal, London (GB); Petar Petrov, London (GB); Jordan Muscatello, London (GB); Gwyneth Harrison-Shermoen, London (GB); Domenico Flauto, London (GB); Sinan Guclu, London (GB); Jacob Cozens, London (GB)

(73) Assignee: EIGEN TECHNOLOGIES LTD, London (GB)

( * ) Notice: Subject to any disclaimer, the term of this patent is extended or adjusted under 35 U.S.C. 154(b) by 0 days.

(21) Appl. No.: 17/849,162

(22) Filed: Jun. 24, 2022

(65) Prior Publication Data

US 2022/0327284 A1 Oct. 13, 2022

Related U.S. Application Data

(63) Continuation of application No. 17/592,269, filed on Feb. 3, 2022, which is a continuation of application No. PCT/EP2020/072790, filed on Aug. 13, 2020.

(30) Foreign Application Priority Data

Aug. 16, 2019 (GB) ..................................... 1911760

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/254* (2019.01); *G06F 16/316* (2019.01);
(Continued)

(58) Field of Classification Search
CPC ........ G06F 16/93; G06F 16/316; G06F 16/35; G06F 16/383; G06F 16/254; G06F 16/345; G06F 40/183; G06F 40/20
See application file for complete search history.

(56) References Cited

U.S. PATENT DOCUMENTS 6,243,723 B1   6/2001  Ikeda et al.
9,516,053 B1 * 12/2016  Muddu ................ G06V 10/225
(Continued)

OTHER PUBLICATIONS

Anonymous: "How to Convert Text into Table in Microsoft Word 2020" retrieved from Internet URL:https://www.youtube.com/watch?v=aVN-KT tMS9k, 4 pages.
(Continued)

*Primary Examiner* — Leslie Wong
(74) *Attorney, Agent, or Firm* — Smith Baluch LLP

(57) ABSTRACT

A computer system for extracting structured data from unstructured or semi-structured text in an electronic document, the system comprising: a graphical user interface configured to present to a user a graphical view of a document for use in training multiple data extraction models for the document, each data extraction model associated with a user defined question; a user input component configured to enable the user to highlight portions of the document; the system configured to present in association with each highlighted portion an interactive user entry object which presents a menu of question types to a user in a manner to enable the user to select one of the question types, and a field for receiving from the user a question identifier in the form of human readable text, wherein the question identifier and question type selected by the user are used for
(Continued)

selecting a data extraction model, and wherein the highlighted portion of the document associated with the question identifier is used to train the selected data extraction model.

18 Claims, 17 Drawing Sheets

(51) Int. Cl.
    *G06F 40/284*      (2020.01)
    *G06F 40/289*      (2020.01)
    *G06F 16/25*      (2019.01)
    *G06F 16/34*      (2019.01)
    *G06F 40/183*      (2020.01)
    *G06F 40/205*      (2020.01)
    *G06F 16/35*      (2019.01)
    *G06F 16/31*      (2019.01)
    *G06F 16/383*      (2019.01)

(52) U.S. Cl.
    CPC ............ *G06F 16/345* (2019.01); *G06F 16/35* (2019.01); *G06F 16/383* (2019.01); *G06F 40/183* (2020.01); *G06F 40/205* (2020.01); *G06F 40/284* (2020.01); *G06F 40/289* (2020.01)

(56) References Cited

U.S. PATENT DOCUMENTS

| | | | | |
|---|---|---|---|---|
| 9,852,215 | B1* | 12/2017 | Sullivan | G06F 16/3334 |
| 10,198,436 | B1* | 2/2019 | Dockhorn | G06F 40/47 |
| 11,087,880 | B1* | 8/2021 | Shah | G16H 50/20 |
| 11,250,841 | B2 | 2/2022 | Roux | G06N 5/04 |
| 11,321,364 | B2* | 5/2022 | Lee | G06F 16/355 |
| 11,521,722 | B2* | 12/2022 | Co | H04M 11/10 |
| 2008/0133213 | A1* | 6/2008 | Pollara | G06F 16/36 703/22 |
| 2010/0169299 | A1* | 7/2010 | Pollara | G06F 40/247 707/E17.022 |
| 2010/0317420 | A1 | 12/2010 | Hoffberg | |
| 2011/0055206 | A1* | 3/2011 | Martin | G06F 40/289 707/723 |
| 2013/0017524 | A1 | 1/2013 | Barborak et al. | |
| 2013/0073514 | A1* | 3/2013 | Cai | G06F 16/951 707/E17.022 |
| 2013/0246098 | A1 | 8/2013 | Habboush et al. | |
| 2014/0149403 | A1 | 5/2014 | Miller et al. | |
| 2015/0019461 | A1* | 1/2015 | Simard | G06F 40/30 706/11 |
| 2016/0048772 | A1* | 2/2016 | Bruno | G06N 5/04 706/11 |
| 2017/0169017 | A1* | 6/2017 | Byron | G06F 16/35 |
| 2018/0107647 | A1* | 4/2018 | Ackermann | G06F 40/279 |
| 2018/0137433 | A1* | 5/2018 | Devarakonda | G06N 5/022 |
| 2018/0285449 | A1 | 10/2018 | Baughman et al. | |
| 2019/0065576 | A1* | 2/2019 | Peng | G06F 16/22 |
| 2019/0286668 | A1* | 9/2019 | Puzicha | G06F 40/166 |
| 2020/0126583 | A1* | 4/2020 | Pokharel | G10L 15/1822 |
| 2020/0285704 | A1* | 9/2020 | Rajani | G06N 5/02 |
| 2020/0320433 | A1* | 10/2020 | Wu | G06K 9/00496 |
| 2020/0327381 | A1* | 10/2020 | Tan | G06F 40/44 |
| 2020/0335183 | A1* | 10/2020 | Tommasi | G06N 20/00 |
| 2020/0380301 | A1* | 12/2020 | Siracusa | G06F 8/34 |
| 2020/0394364 | A1* | 12/2020 | Venkateshwaran | G06F 40/289 |
| 2022/0253594 | A1* | 8/2022 | Potts | G06F 3/04842 |
| 2022/0327138 | A1 | 10/2022 | Benincasa et al. | |
| 2022/0327284 | A1 | 10/2022 | Benincasa et al. | |

OTHER PUBLICATIONS

International Search Report in Application No. PCT/EP2020/072790 dated Sep. 21, 2020, 14 pages.

* cited by examiner

| Token Sequence $S$ | $f_1$ | $f_2$ | $f_3$ | $f_4$ | ... | $f_m$ | Label Sequence $L$ |
|---|---|---|---|---|---|---|---|
| $s_1$ | | | | | | | 0 |
| $s_2$ | | | | | | | 0 |
| $s_3$ | | | | | | | 1 |
| $s_4$ | | | | | | | 0 |
| $s_5$ | | | | | | | 0 |
| ... | | | | | | | ... |
| $s_m$ | | | | | | | 0 |

Figure 3

| 40 fields extracted | ○ training data 15%  ○ high confidence 48%  ○ low confidence 38% | | | MARK FOR REVIEW | EXPORT |
|---|---|---|---|---|---|
| Agreements | Q1 1992 or 2002? | Q2 Party A? | Q3 Agreement Data? | Q4 Governing Law? | |
| ISDA102 - 1992 | 1992 | FIFTH THIRD BANK | March 2, 2007 | N/A | |
| ISDA110 - 2002 | 2002 | THE BANK OF NOVA SCOTIA | December 12, 2008 | State of New York | |
| ISDA111 - 2002 2 | 2002 | SCHEDULE | July 2, 2012 | State of New York | |
| ISDA105 - 1992 | 1992 | WELLS FARGO BANK | April 10, 2008 | N/A | |
| ISDA117 - 1992 | 1992 | BARCLAYS BANK PLC | October 20, 2008 | N/A | |
| ISDA114 - 1992 | 1992 | SUNTRUST BANK | July 17, 2012 | N/A | |
| ISDA113 - 2002 | 2002 | MORGAN STANLEY | December 14, 2009 | State of New York | |
| ISDA120 - 2002 | 2002 | LLOYDS BANKING GROUP | April 22, 2011 | England and Wales | |
| ISDA104 - 2002 | 2002 | EX-10.8 | •February 13, 2008 •February 13, 2008 | England and Wales | |
| ISDA119 - 1992 | 1992 | COMERICA BANK | September 26, 2007 | N/A | |

| |
|---|
| In addition, the Rated Notes may be redeemed in part by Class from Refinancing Proceeds at the applicable Prices, from any Refinancing Proceeds on any Business Day falling on or after expiry of the Non-Call Period at the direction of (i) the Portfolio Manager or (ii) the Subordinated Noteholders (acting by way of Ordinary Resolution), at least 30 days prior to the Redemption Date to redeem such Class of Rated Notes (any such redemption and refinancing, a "Refinancing"). Any such redemption shall be of an entire Class or Classes of Notes subject to a number of conditions. See Condition 7(b) (Optional Redemption). |
| THIS AGREEMENT is dated 12 July 2016 and made between: |
| (1) STEINHOFF EUROPE AG, a company incorporated under the laws of Austria and registered under number FN38031d as company and borrower (the "Company" and the "Borrower"); |
| 3.1 Your salary will be £25,000 per annum subject to deductions for income tax, employee's national insurance contributions and any other deductions required by law. Your salary will accrue on a day-to-day basis and will be payable monthly in arrears on or about the last day of each month. |
| This register describes the land and estate comprised in the title.<br>HAMMERSMITH AND FULHAM |
| 1 The freehold land shown edged with red on the plan of the above Title filed at the Registry and being 92 Brackenbury Road London W6 0BD |
| This INVESTMENT MANAGEMENT AGREEMENT, dated and effective as of 16 March 2014 (the "Agreement"), is between BLACKSTONE ALTERNATIVE INVESTMENT ADVISORS LLC, a Delaware limited liability company (the "Investment Manager"), and BLACKSTONE ALTERNATIVE MULTI-STRATEGY SUB FUND II LTD, a Cayman Islands exempted company (the "Fund"), a wholly-owned subsidiary of Blackstone Investment Funds ("BAIF"), a Massachusetts business trust and open-end investment company registered under the Investment Company Act of 1940, as amended (the "Investment Company Act"), on behalf of its series, Blackstone Alternative Multi-Strategy Fund ("BAMSF"). The purpose of the Fund is to facilitate the implementation of BAMSF's investment strategies. |
| 2 (30.10.2007) REGISTERED CHARGE dated 17 October 2007. |
| 3 (25.03.2001) Proprietor CLYDESDALE BANK PLC (Scot. Co. Regn. No. SC001111) of 30 St. Vincent Place, Glasgow G1 2HL. |

Figure 12 (cont...)

ID
TRAINING AND APPLYING STRUCTURED DATA EXTRACTION MODELS

CROSS REFERENCE TO RELATED APPLICATION

This application is a continuation application of U.S. application Ser. No. 17/592,269 filed on Feb. 3, 2022, entitled "TRAINING AND APPLYING STRUCTURED DATA EXTRACTION MODELS," which is a bypass continuation application of International Application No. PCT/EP2020/072790 filed on Aug. 13, 2020, entitled "TRAINING AND APPLYING STRUCTURED DATA EXTRACTION MODELS," which claims priority to GB Application No. 1911760.5 filed on Aug. 16, 2019, entitled "TRAINING AND APPLYING STRUCTURED DATA EXTRACTION MODELS." Each of these applications are incorporated by reference herein in its entirety for all purposes.

TECHNICAL FIELD

The present invention relates to a computer implemented method and a computer system with an improved user interface for facilitating training of models for extracting data from documents. The invention further relates to training data extraction models and using trained data extraction models.

BACKGROUND

Data extraction or information extraction in the present context refers to the extraction of structured data from unstructured or semi-structured electronic document text. Unstructured text documents typically contain "free text" in which the underlying information is mainly captured in the words themselves. Semi-structured test, by contrast, captures a significant portion of the information in the position, layout and format of the text. Documents containing tables are one example of semi-structured text documents.

One class of data extraction system can only perform effectively on narrowly-defined document types for which they have been purpose built. One example is a rules-based system, in which human-constructed rules are applied to extract structured data. Those rules are generally tailored by a domain expert to a very specific type of document, meaning that such systems have very limited flexibility. Other systems use "pre-fab" machine learning (ML) models and libraries which would typically need to be created by an expert solution's engineer and are also tailored to specific document types. Both types of system require extensive engineering effort in order to extend them to new use cases, such as new document types or new information extraction tasks—typically several days, weeks or even months of engineering effort depending on the specifics of the system. As well as requiring significant human effort and expertise, it has been observed that some such systems do not achieve state of the art accuracy. This restricts such models to quite "niche" applications in practice.

Another class of data extraction system uses what are referred to colloquially herein as "big tech" models. These would typically be models trained on extremely large quantities of training data, and would typically be based on neural networks (e.g. convolutional neural networks (CNNs) or other deep learning networks etc). These can typically achieve better accuracy and tend to be a somewhat more flexible in terms of the range of documents types on which they can perform effectively. Nevertheless, they require large amounts of training data, and still suffer from flexibility issues in that extending such models to new use cases requires not only a sufficiently large quantity of appropriate data, but also several days or weeks of engineering effort in practice assuming the necessary data is available.

SUMMARY

Therefore, there exists a need for an effective data extraction system which (i) can be extended to new use cases/document types in a shorter amount of time (e.g. several minutes or hours to configure the system to perform a new information extraction task), (ii) by a non-technical user, (iii) using a limited number of training samples (e.g. 2-50 training datapoints (examples) per information extraction task), (iv) whilst achieving competitive accuracy in comparison with big tech models (typically greater than 80% on pure extraction tasks). Herein, the term "question" is used to refer to an information extraction task (which is preferably defined by the non-technical user by way of the training examples he or she provides) and a structured data output is said to take the form of one or more "answers" to that question.

The present techniques allow a user to train a model to be able to extract relevant information relating to one or more user defined questions from documents. The data extraction models can be trained on a relatively small number of documents, and still provide accurate outcomes when used to analyse documents. This greatly reduces the time and effort required by a user before the system can commence useful data extraction. The present invention also provides a user-friendly user interface which guides the user to enable him to define specific questions and label the training data in a simple and intuitive manner.

According to a first aspect of the present invention, there is provided a computer system for extracting structured data from unstructured or semi-structured text in an electronic document, the system comprising:
a. a graphical user interface configured to present to a user a graphical view of a document for use in training multiple data extraction models for the document, each data extraction model associated with a user defined question;
b. a user input component configured to enable the user to highlight portions of the document;
c. the system configured to present in association with each highlighted portion an interactive user entry object which presents a menu of question types to a user in a manner to enable the user to select one of the question types, and a field for receiving from the user a question identifier in the form of human readable text, wherein the question identifier and question type selected by the user are used for selecting a data extraction model, and wherein the highlighted portion of the document associated with the question identifier is used to train the selected data extraction model.

In embodiments, the questions types may comprise two or more of: a point extraction question type, a section extraction question type and a table extraction question type.

The text may be tokenized and features may be extracted from the tokenized text in dependence on the selected question type.

A common model type may be used for said two or more question types but with different features and tokenization.

The system may be configured to assign, for each user defined question, a label to each token of the tokenized text based on any highlighted portion or portions of the text associated with that question, wherein that label may be used to train the data extraction model associated with that question.

The user interface may be configured to present graphical views of multiple documents in sequence, to enable the user to highlight portions of each document for use in training the multiple data extraction models.

The graphical user interface may present a tabulated format comprising multiple rows and columns, each row having a document identifier of one of the documents and each column having associated therewith one of the questions identifiers, whereby each cell in each row corresponds to one document and one question, and populated with any highlighted portion or portions of that document associated with that question.

A prediction component may be configured to use the trained data extraction models to extract from unlabelled documents answers to the user defined questions, wherein each answer extracted by each data extraction model may comprise or denote any portion of portions of text determined to be relevant to the question associated with that data extraction model.

An updated tabulated format may be presented after training, with additional rows corresponding to the documents from which answers have been extracted by the data extraction models, in which the extracted answers may be arranged according to question identifier.

The system may be configured to enable the user to highlight portions of the text for different questions of different question types in the same document.

The row of the tabular format corresponding to that document may contain highlighted portions associated with the different questions of the different question types.

In response to a view change instruction received in respect of one of the document identifiers, the graphical user interface may be configured to switch to a view of that document to enable the user to highlight further portion(s) of the document.

The highlighted portion of each document in each cell may be selectable to switch to a view of that document in which that portion may be visible and visibly highlighted on the graphical user interface.

The graphical user interface may be configured to output a suggested question type for each highlighted portion based on the highlighted portion.

The question type may be suggested based a length of the highlighted portion.

According to a second aspect of the present invention, there is provided a computer system for extracting structured data from unstructured or semi-structured text in an electronic document, the system comprising:
a. a plurality of data extraction models, each model configured to receive training data relating to a user defined question, wherein the user defined question conforms to one of multiple question types;
b. a training data generator configured to:
c. tokenize each electronic document of a document cohort as a sequence of tokens;
d. receive, for each of multiple electronic documents of the document cohort, at least one highlighted portion of text for at least one user defined question, wherein the highlighted portion of text has been graphically highlighted by a user as being relevant to that user defined question in a document view of a graphical user interface, and
e. provide for each sequenced token of each document a feature value for each of a set of features characterising the token, and a label for each question which indicates if the token is relevant or not relevant to that question based on the at least one graphically highlighted portion of text, the labels being sequenced according to the tokens,
f. wherein each model is trained using the feature values and the sequenced labels for a specific user defined question as the training data.

In embodiments, for at least one document, at least two portions may be graphically highlighted in respect of at least two of the user defined questions.

The at least two questions may be of different question types.

Each token may be a word token.

Each token may be a section token.

At least one of the features may be dependent on a candidate label assigned to the token and a candidate label assigned to at least one other token in the sequence.

At least another of the features may be dependent on an observation computed for the token and the candidate label of the token but independent of any label of any other token.

The or each data extraction model may be a conditional random field.

The questions types may comprise multiple section question types for different section lengths (e.g. sentence and longer section question types).

Multiple models may be trained for at least one of the user defined questions, and evaluated in order to select one of the multiple models for that question.

The multiple models may have different tokenization, different features, and/or different labelling schemes.

A third aspect of the present invention provides a method of training a data extraction model to identify an extracted point from unstructured or semi-structured text of an electronic document, the method comprising:
a. providing a training data structure for training a data extraction model associated with a single user defined question by converting each of a cohort of unstructured or semi-structured documents into word tokens representing words of the document,
b. generating, for each document, for each word token of the document, feature values of a set of features derived from the word tokens, the features including at least one feature associated with the relative position of the word token in a sequence of tokens representing each document,
c. providing, for each document, a label for each token word, the label being a label which indicates whether the word token is relevant to the user defined question, or whether the word token is not relevant to the user defined question, the labels being sequenced according to the sequence of tokens,
d. training the document extraction field model over the cohort of documents using the feature values and the sequenced labels.

In embodiments, the at least one feature may be dependent on the position of the word token relative to the start of the document.

For example, the at least one feature may be expressed in proportion to a length of the document.

Each of at least some of the features may be a binary feature indicating whether the token matches a defined word.

Each of said binary features may be independent of the capitalization of the word and one or more additional binary features may be provided to indicate a capitalization style.

Each of at least some of the features may be a binary feature indicating whether a shape of the word matches a defined word shape.

Each defined word and/or word shape may be derived from the cohort of documents.

At least one of the features may be dependent on one or more feature values of one or more other word tokens within a window of the word token.

A fourth aspect of the present invention provides a method of training a data extraction model for identifying whether chunks of structured or unstructured text are relevant to a single user defined question, the method comprising:

dividing a document into predetermined chunks of text, and
a. for each chunk:
i. generating feature values for each feature in a feature set of the data extraction model, wherein the feature values are determined by tokenising unstructured text of the chunk and assessing each token based on its properties and its relationship to other tokens within the chunk,
ii. applying a structured data training set to a conditional random field model, wherein the training data set comprises feature values of a set of features for each chunk of the document, with a label as to relevance or non-relevance of that chunk, the chunks in a predetermined sequence in the document.

According to the terminology applied herein, each chunk may be referred to as a "section token", and the dividing of the document into chunks constitutes a first tokenization step.

The tokenization of the text of each chunk constitutes a second tokenization step, and may be performed at the word-level (for example), such that each section token corresponds to a subsequence of word tokens. The term sub-token may be used more generally.

Accordingly, labels are assigned and features are extracted at the section token level. The features extracted for a section token may depend on its constituent sub-tokens and their relationship to each other.

A fifth aspect of the present invention provides a computer-implemented method of extracting structured data from unstructured or semi-structured text in an electronic document, the method comprising:
a. tokenizing the text as a token sequence of section tokens, wherein each section token corresponds to a portion of the text;
b. for each of multiple candidate label sequences, wherein each label sequence of the multiple candidate label sequences assigns a label to each section token: extracting a set of feature values for each section token, wherein at least one feature value of the set of feature values depends on (i) the label assigned to that section token by that label sequence and (ii) the label assigned to at least one other section token in the token sequence by that label sequence;
c. applying at least one data extraction model to each label sequence of the multiple candidate label sequences and the set of feature values determined for that label sequence for each section token, thereby computing a score for each label sequence;
d. selecting a label sequence for the token sequence based on the computed scores; and
e. providing the extracted structured data, in the form of one or more extracted section tokens of the token sequence, based on the selected label sequence.

The terms "span" and "section token" are used synonymously herein.

In embodiments, at least some of the features may be learned from training documents used to train the data extraction model (extraction training documents).

Each document of the extraction training documents may be tokenized and each section token thereof may be labelled as relevant or non-relevant to a question which the document extraction model is trained to answer.

In some cases, features may be extracted from the section tokens labelled as relevant only (and not the non-relevant section tokens).

Alternatively or additionally, at least some of the features may be learned from documents which have not been used to train the data extraction model(s). Such documents may be referred to as "treasure chest" documents to distinguish them from the documents used to train the data extraction model(s) itself.

At least one of the features may be extracted by, for each of multiple known terms, computing a term frequency-inverse document frequency (tf-idf) value based on a count of occurrences of that term in the portion of text and an idf weight.

The idf weight may have been learned from a set of tokenized training documents, being the inverse of the number of section tokens of those documents in which the term appears (so that a lower weight is applied for terms which appear in proportionally more section tokens across those documents).

That is, the idf weighting may be based on the collection of spans from all the documents, rather than the documents themselves (this is in contrast to an idf weighting at the document level, which would be the inverse of the number of documents containing that term).

The documents from which the idf weight is learned may be different from the documents used to train the data extraction model. For example, a "pre-trained" tf-idf model may be used, so the vocabulary and weighting are learned from the treasure chest. Alternatively, the idf weights may be learned from the extraction training documents.

A feature value may be extracted as a weighted sum of the tf-idf values, in which each tf-idf value is weighted by a learned dimensionality reduction weight.

The dimensionality reduction weights may have been learned from the treasure chest or from the extraction training document.

Alternatively or additionally, at least some features may be extracted for each section token by determining a distribution across topics for that section token (e.g. using a Latent Dirichlet Allocation model(s) or other probabilistic topic extraction model(s)), wherein each of said at least some features is, or is derived from, a probabilistic topic prominence value for a single one of the topics and that section token. That is, a numerical value corresponding to that single topic, which expresses a probabilistic proportion of the section token allocated to that topic. Each of the topics may be determined for each section token as a distribution over a topic word set.

Alternatively or additionally, at least one feature value may be extracted by computing a count of occurrences of any words of a topic word set within the portion of text corresponding to the section token, and extracting a feature value as a topic prominence value for the topic word set.

The topic prominence value may express the count in proportion to a total word count of that portion of text.

Each topic may be a distribution over the topic word set. For example, topics may be assigned using Latent Dirichlet Allocation (LDA), and may be referred to as LDA topics.

Multiple topics having different topic word sets may be defined, and one or more features may be extracted for each topic.

In determining at least one feature value, a topic distribution may be determined for the portion of text corresponding to the section token.

The topic distribution of each section token may be compared to an average topic distribution to extract a feature value for that section token as a divergence between those distributions.

The average topic distribution may be determined from sections of the training data labelled as relevant (excluding non-relevant sections).

The data extraction model may have been trained using ground truth labels assigned to tokenized training documents, and the ground truth labels may have also been used to select a subset of section tokens of the tokenized training document, and learn at least one property of the subset of section tokens, wherein a feature value is extracted for each section token based on the learned property.

The property could for example be a learned set of keywords, or an average topic distribution etc.

A feature value may be computed for each section token based on at least one feature value extracted for at least one other token in the token sequence. For example, the feature value(s) extracted from one or more section tokens within a defined window of the section token (windowing based on proximity to current feature token).

An overarching approach to information extraction with CRFs uses full sequence prediction in combination with marginal selection, in a hierarchical fashion. This increases the ability of the system to extract useful structured data ("answers") from unstructured or semi-structured documents, and is particularly effective in circumstances when full sequence production alone would fail to identity any relevant token. The term "answer forcing" may be used to reflect this hierarchical approach: when full sequence prediction does not identify any positive answers, the systems revers to marginal selection in an attempt to "force" an answer.

A sixth aspect of the invention provides a computer-implemented method of extracting structured data from unstructured or semi-structured text in an electronic document, the method comprising:

a. tokenizing the text as a token sequence;
b. extracting features for each token of the token sequence;
c. applying a data extraction model to the extracted features to determine a highest-probability label sequence for the token sequence, wherein the label sequence assigns a label to each token, which indicates if that token is relevant to a question;
d. wherein if the highest-probability label sequence indicates that at least one token is relevant to the question, then that token(s) is provided as an answer to the question, the extracted structured data comprising the answer in that event;
e. wherein if highest-probability label sequence indicates that no token is relevant to the question, then an answer forcing process is applied by:
f. determining, for each token of the token sequence, a marginal probability of that token being relevant, wherein the at least one of the marginal probabilities is used to determine a forced answer.

In embodiments, if the highest marginal probability meets a probability threshold, the forced answer comprises at least the token having the highest marginal probability, and if not, the forced answer is a null result.

The threshold could be fixed or dynamic.

The threshold could be predetermined, or learned from training data.

Each token may be a point token or a section token with features extracted as above.

In embodiments, dynamic programming may be used to determine the label sequence having the highest computed probability, without computing the probability of every possible label sequence (in that case, the set of candidate label sequences if a subset of all possible label sequences). Dynamic programming may also be used to compute the marginal probability for each token, without requiring the probability of every possible label sequence to be computed.

In embodiments, a first dynamic programming algorithm (e.g. the Viterbi algorithm) may be used to determine the highest-probability label sequence, and a second dynamic programming algorithm (such as the forward-backward algorithm) may be used to determine the marginal probability of each token.

The data extraction model may be applied to the extracted features to compute a probability of each label sequence of multiple candidate label sequences, wherein each label sequence may assign a label to each token, which indicates if that token is relevant to a question; wherein, for each token of the token sequence, a marginal probability of that token being relevant may be computed as a sum of the probabilities computed for the subset of all candidate label sequences for which that token is relevant, wherein the at least one of the marginal probabilities may be used to determine a forced answer.

Another aspect herein provides a computer-implemented method of extracting structured data from unstructured or semi-structured text in an electronic document, the method comprising:

a. tokenizing the text as a token sequence;
b. extracting features for each token of the token sequence;
c. applying a data extraction model to the extracted features to compute a probability of each label sequence of multiple candidate label sequences, wherein each label sequence assigns a label to each token, which indicates if that token is relevant to a question;
d. determining the label sequence having the highest computed probability;
e. wherein if the highest-probability label sequence indicates that at least one token is relevant to the question, then that token(s) is provided as an answer to the question, the extracted structured data comprising the answer in that event;
f. wherein if highest-probability label sequence indicates that no token is relevant to the question, then an answer forcing process is applied by:
g. determining, for each token of the token sequence, a marginal probability of that token being relevant, as a sum of the probabilities computed for the subset of all candidate label sequences for which that token is relevant, wherein the at least one of the marginal probabilities is used to determine a forced answer.

Further aspects of the invention provide one or more computer programs, stored on transitory or non-transitory media, for programming a computer system to implement the steps or functionality of any of the claims, and a computer system comprising one or more such programmed computers.

Another aspect provides one or more data extraction models trained in accordance with any of the training methodologies disclosed herein for execution on one or more computers to extract data from unstructured or semi-structed text documents.

BRIEF DESCRIPTION OF THE DRAWINGS

To assist understanding of the present disclosure and to show how embodiments may be put into effect, reference is made by way of example to the accompanying drawings in which:

FIG. 3 shows an example of features and ground truth labels assigned to tokens for training a data extraction model to answer a user-defined session;

FIG. 8 shows an example of a user interface for presenting the results of document analysis to the user for multiple documents;

FIG. 9 shows an example of a user interface for presenting the results of document analysis to the user for a single document;

FIG. 10 shows a second example of a user interface used by the user to highlight a document so that labels may be assigned to respective tokens, in a tokenized representation of the document, in accordance with highlighting applied by the user at the user interface;

FIG. 11 shows examples of extracted "points", in which each extracted point is represented as a highlighted portion of text within the original document based on a mapping of point tokens to document characters;

FIG. 12 shows examples of extracted "sections", in which each extracted section is represented as a highlighted portion of text within the original document based on a mapping of section tokens to document characters;

DETAILED DESCRIPTION

Figure 1:
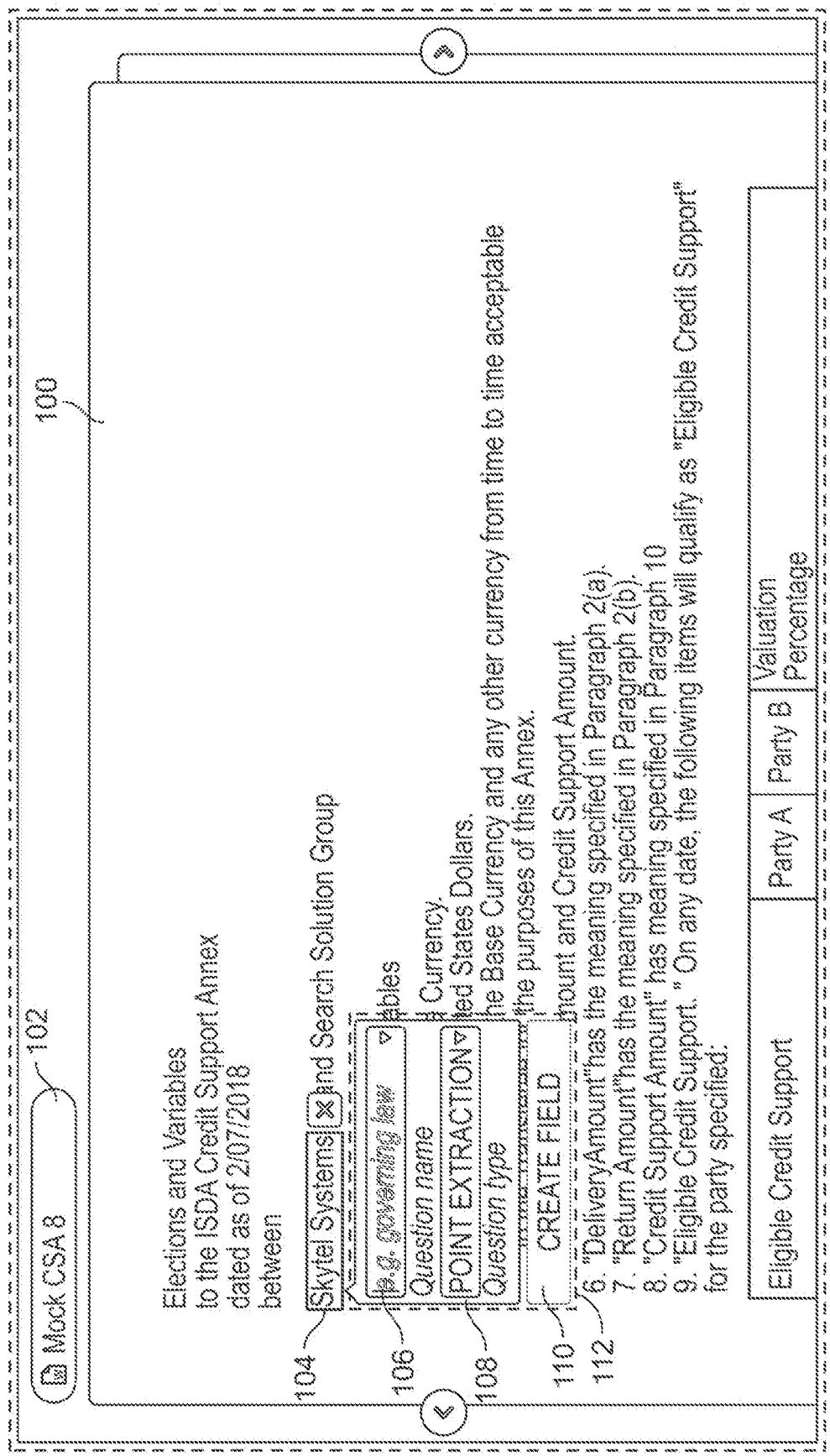
FIG. 1 shows a first example of a graphical user interface used by a user to selectively highlight a document for the purpose of assigning ground truth labels to a tokenized representation of the document.

The present disclosure provides a document analysis system. The system is used to analyse documents of different types to answer "questions" relating to the documents: the system uses Natural Language Processing (NLP) to extract data from diverse documents quickly and accurately. It allows users to obtain answers to meet critical operational challenges, by unlocking the information in a diverse range of documents. Unique questions can be defined by each user according to their specific needs.

A blank (untrained) machine learning (ML) model is trained to extract "answers" to a single user-defined question. Such models may be referred to herein as data extraction models. When a user defines a new question, a new—and, at that point, blank—data extraction model is created and will be trained on the single task of answering that question. The user can assign a question identifier to each question and may choose to include information about the question in the question identifier. However, that information is for his own benefit (and, where applicable, the benefit of other users)—it is not required by the data extraction model to understand the question or how to answer it. Rather, the data extraction model learns how to answer the single question to which it relates from labelled examples in a training process. Each labelled example takes the form of a labelled token in a tokenized representation of a training document. That is, each token of the training document is associated with a label. In the examples that follow, the label is a binary label which identifies the token as either relevant to the specific question (positive example) or not relevant to the specific question (negative example). However, other labelling schemes can be used to indicate token relevance, such as BIO (beginning-inside-outside) or BILOU (beginning-inside-last-outside-unit). Labelling schemes such as BIO and BILOU can be used to additionally indicate the relative position of a token within a relevant chunk (and to distinguish chunks of multiple tokens from "unit", i.e. single-token, chunks). Although the following description uses binary labelling as an example, the description applies equally to other labelling schemes. The document extraction system learns how to answer the specific question from multiple such labelled training documents.

The terms 'query' and 'question' are used interchangeably herein.

The user can define multiple questions, which causes multiple models to be created (one per question). Each model is trained independently of the other model(s) to answer the specific question to which it relates.

A benefit of this approach is that new questions can be defined without having to re-train the existing models. Another benefit is that an existing model that is not performing adequately on the question to which it relates can be retrained without having to retrain the other existing model(s) relating to different user defined question(s).

Figure 10:
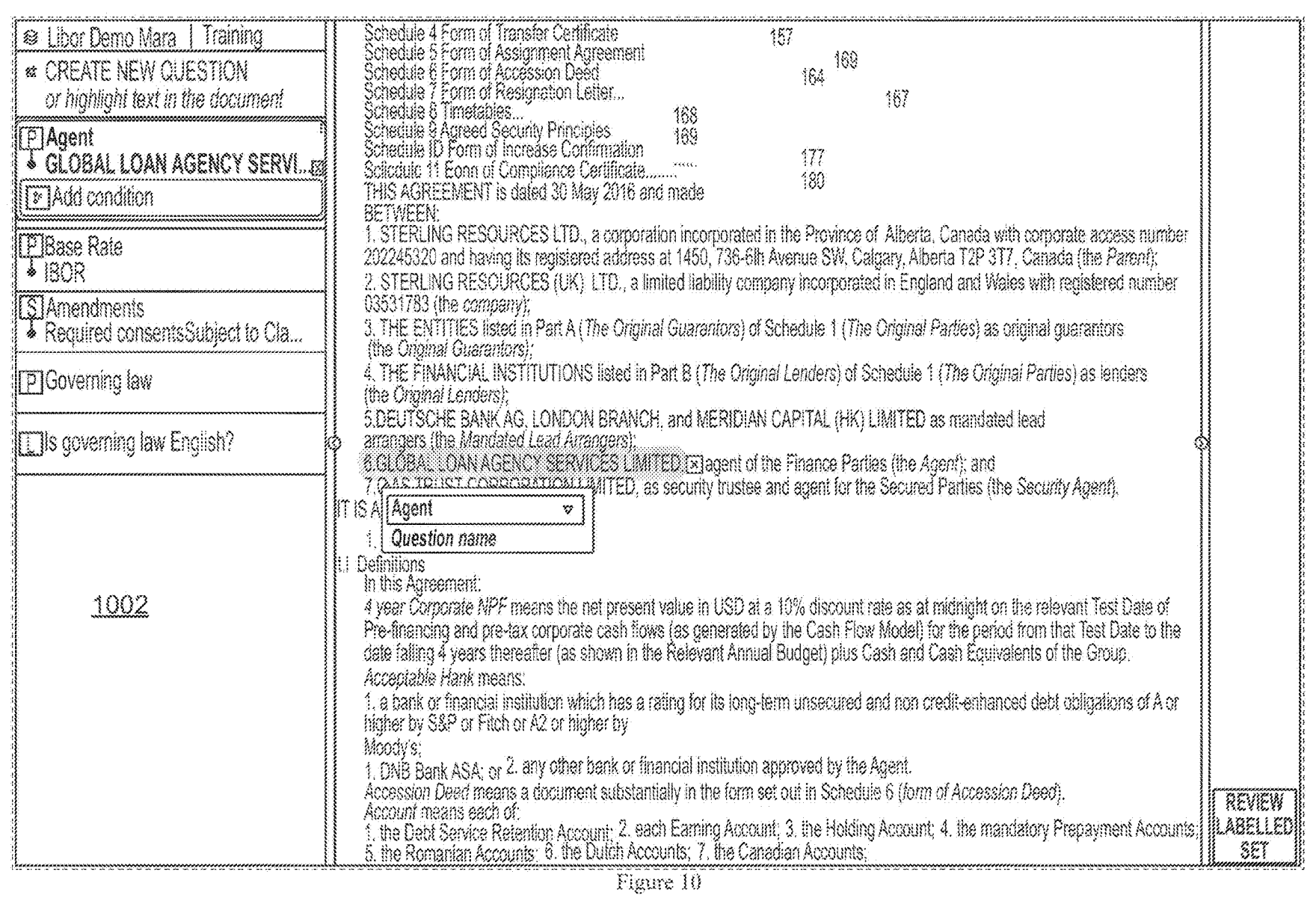

The user himself provides the information needed to label the tokens by selectively highlighting documents at a graphical user interface (GUI) to indicate answers to his defined question (see FIG. 10). The relationship between tokens and the corresponding characters of each original (untokenized) document is stored, which in turn allows labels to be assigned to each token based on any highlighting applied by the user to the corresponding characters of the original document. Not all user-highlighted documents are necessarily used for training—some may be used for validation, as described below. Labels assigned in this way are referred to as "ground truth" labels.

This allows high-quality training and validation data to be created by a non-technical user, in a simple an intuitive manner, using visual highlighting at the GUI. The details of labelling and tokenization are not exposed to the user, and the user is simply required to visually highlight a reasonable number of relevant documents to indicate the answers to his defined question.

At inference, the trained data extraction model receives an unlabelled document in tokenized form and answers the specific question in respect of that document by labelling each token of the document as relevant or not relevant to the specific question. Such labels may be referred to as "inferred labels" or, synonymously, "predicted labels". This leverages the knowledge the model has previously learned during training. Generally speaking, the "answer" extracted from that document consists of all token(s) which the data extraction model has labelled as relevant; if multiple tokens are identified as relevant, each contiguous sequence of tokens is considered as a single answer and the list of all these is returned as the full answer to a given question).

The extracted answer may be presented at the user interface by rendering the corresponding characters (text) of the original document in a tabular format, in which each cell corresponds to a specific question and a specific document (answer table—see FIG. 8).

Figure 12:
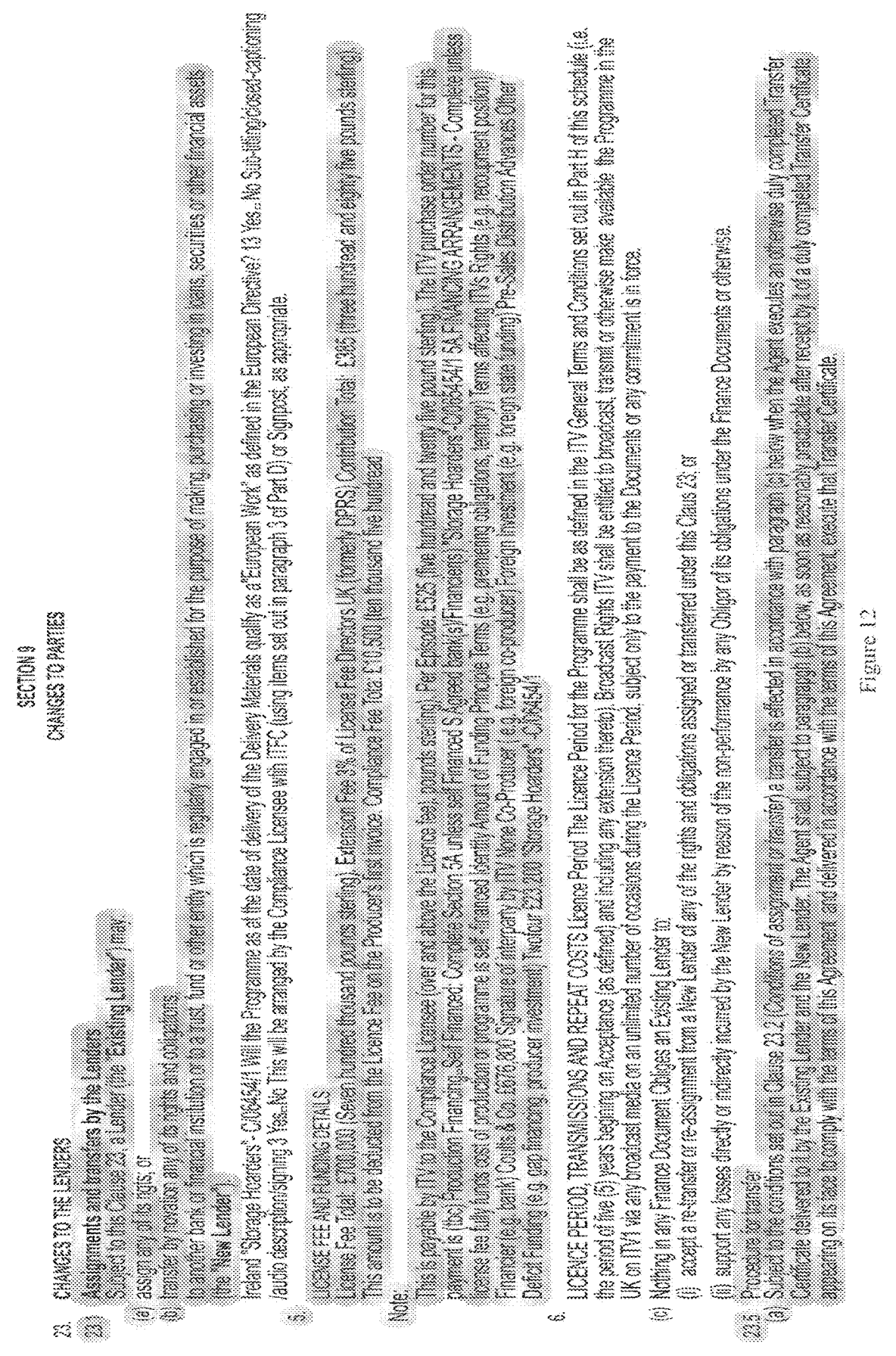

To provide further context to the extracted answer, the relationship between the characters of the original document and the tokenized representation is stored, which, for example, allows the extracted answer to be indicated in a view of the original document, by automatically highlighting the corresponding characters in the original document (see FIGS. 11 and 12).

The system uses different back-end processes to address different categories of queries (query types) to enable accurate extraction of "points" (words/short phrases) and "sections" (e.g. paragraphs/clauses) from diverse text, enabling documents to be turned into actionable data. In the present context, words and short phrases may be considered "points" and are extracted in a point extraction process. Longer chunks of text may be considered "sections", and are extracted in a section extraction process. Data may also be extracted from tables in a table extraction process. Broadly speaking, these data extraction processes all use the same form of data extraction model but with different features and tokenization. That is, point extraction models, section extraction models and table extraction models generally refer to data extraction models of the same architecture but with different features and tokenization.

Sections could be sentence-level, or longer sections (e.g. paragraphs). In some implementations, options for multiple section types may be provided, such as different questions types for sentences and longer sections.

The system provides a logic interface to enable complex questions to be answered. In such logic-based questions, data points extracted from the documents may be linked together with mapping rules to construct and answer complex questions seamlessly.

A particularly useful aspect of the present system is the ability for models to be built for any document type, learning from a small training data set, and without requiring a specific type of model to be used for a specific type of document, i.e. the "blank" (untrained) model is not specific to any particular document type but only becomes specific to a particular document type once trained on documents of that type. This allows a user to present their own kinds of documents, and quickly train a model which can then analyse future documents of a similar type.

Examples of advantages of the system include the following:
review of contracts to ensure compliance with regulations
automated extraction of granular information from asset portfolios
reduction of the time for conducting due diligence exercises and identifying patterns of fraudulent activity
identification of clauses in documents for re-examination and triage
deliveries of institutional knowledge from various sources
empowering faster and more intelligent contract negotiations, through analysis of data derived from contracts of a similar type
the structured data output can be leveraged for prioritization and processing of incoming requests to guide proper outcomes.

A brief overview of the system will first be described, before describing various aspects in detail.

Tokenization

Each document which is parsed by the document analysis system, either for use in training a data extraction model or for analysis by a trained data extraction model (at inference), is tokenised, i.e. divided into "tokens". A token is an atomic unit of text on which a document extraction model operates. In certain contexts, multiple tokenized forms of a given document may be determined using different tokenization, for use by different extraction models, as described later. Hence, depending on the context, a token may correspond to one or multiple words of a document (tokens may also represent other attributes such as punctuation, formatting etc.).

A tokenized representation of a document takes the form of a sequence S of m tokens:

$$S=(s_1,s_2,s_3,\ldots s_i,\ldots s_m)$$

where $s_i$ represents the token at position i in the sequence S.

The tokenization used is dependent on the question type, as described later.

Labelling

A label is applied to each token, $s_i$, in the sequence of tokens, S, to generate a corresponding sequence of labels:

$$L=(l_1,l_2,l_3,\ldots l_i,\ldots l_m)$$

where $l_i$ is the label assigned to the $i^{th}$ token in the sequence of tokens, S.

Note that, for the most part, the mathematical notation used in this document does not explicitly distinguish between ground truth labels and predicted labels (L could represent either in general). It will be clear in context which is meant.

The label assigned to a token indicates whether the token is relevant or not to a specific user defined question, i.e. whether the token is associated with the answer to the user defined question. In the present example, each label is a binary label, where a label value of 1 indicates that the corresponding token is (part of) an answer to the question (is relevant), and a label value of 0 indicates that the corresponding token is not (part of) an answer to the question (not relevant). This is a form of "I/O" labelling. Each label sequence is specific to a single question, and hence to a single extraction model. A separate label sequence is defined for each question when there are multiple user-defined questions. Those label sequences may, in some cases, have different lengths as they may pertain to different tokenized forms of the document. As noted above, the description applies to other labelling schemes that can be used to indicate relevancy to a particular question.

Features

Features are assigned to each token in a sequence of tokens by evaluating defined feature functions. Different types of feature functions are described later. Each feature function provides a single numerical value (i.e. a one-dimensional output), which may be categorical (e.g. binary, represented numerically as 0 or 1) or continuous (e.g. floating point).

Unless otherwise indicated, the term feature refers to the numerical value assigned to a given token by evaluating a particular feature function for that token. However, the term feature may also be used occasionally to refer to the feature function itself, and the term feature value may be used to refer to the output of the feature function—it will be clear in context what is meant.

Binary features are appropriate for expressing a binary ("yes/no") property of token. For example, a basic feature function may evaluate if the token is a noun, with feature value 1 representing a noun and feature value 0 representing a non-noun (generally there would also be other conditions attached, pertaining to the labels themselves—see below). Non-binary features are appropriate for expressing some property of a token on a one-dimensional numerical scale. Such properties may or may not be human interpretable. For example, a non-binary feature may be a single component (dimension) of a word embedding, or another feature derived from supervised or unsupervised ML feature extraction.

The evaluation of feature functions may be referred to as "feature extraction".

In general, a feature function $f_j$ is denoted herein using the following notation:

$$f_j(i,S,L) \quad (1).$$

This notation means a feature of the token $s_i$ at position i in the sequence S, as extracted by evaluating the feature function $f_j$ for that position i given both the token sequence S and the label sequence L. This may be referred to more concisely as feature j of token $s_i$. The dependency on the labels (as well as tokens) reflects the form of data extraction model used herein (see next section).

Expression (1) represents the most general form of feature function that takes into account both tokens and their labels. However, in the described implementations, two more strongly constrained versions of the generic feature function $f_j(i, S, L)$ are used.

The first type of feature function is a "transition" function defined as:

$$TR_{y_1,y_2}(i,S,L) := I_{y_1}(l_i) * I_{y_2}(l_{i-1}). \quad (2)$$

The output of the transition function is a numerical value referred to as a transition feature of the token $S_i$ at position i. For IO labelling, $y_1 \in \{0,1\}$ and $y_2 \in \{0,1\}$. Hence, four transition functions $TR_{0,0}$, $TR_{0,1}$, $TR_{1,0}$ and $TR_{1,1}$ are defined and each token has four corresponding transition features. As is evident from Equation (2), the transition function depends on the label $l_i$ of the token $S_i$ (the "current" token) and the label $l_{i-1}$ of the preceding token $s_{i-1}$.

The second type of feature function is defined as:

$$O_{x,y}(i,S,L) := g_x(i,S) * I_y(l_i) \quad (3)$$

and $O_{x,y}(i, S, L)$ may be referred to as an "observation feature" (or, synonymously as a "state feature"). In Equation (3), $y \in \{0,1\}$ for I/O labelling and $x \in \{1, \ldots X\}$. The first term $g_x(i, S)$ is referred to as the xth observation for token $S_i$ (with X observations in total per token). Note that each observation x provides two observation features: one for the label value y=0, $O_{x,0}$, and the other for the label value y=1, $O_{x,1}$. As is evident from Equation (3), the observation function depends on the position i of the current token and can depend on any token in the sequence S (by virtue of the first term) and the label $l_i$ of the current token (by virtue of the second term).

In both of the above equations, $I_y(l_i)$ is an indicator function which is used to capture dependency on labels:

$$I_y(l_i) = \begin{cases} 1 & \text{if } l_i = y \\ 0 & \text{otherwise} \end{cases}.$$

The observation $g_x(i, S)$ could for example depend on one or more of:
the current token $s_i$ (i.e. the token at position i),
another token(s) at a specific position relative to the current token (e.g. the token at position i-2),
another token(s) at an absolute position in the sequence (e.g. it may always depend on the first token in the sequence, whatever the value of i).

Features are also dependent on question type, i.e. different sets of feature functions are used for different question types.

Conditional Random Fields

The present system uses Conditional Random Fields (CRF) as data extraction models to analyse documents. A CRF is a discriminative model which is able to compute the probability of a given label sequence L for a given token sequence S (i.e. the probability that L is the correct label sequence for S) as $$p(L \mid S) = \frac{1}{N} \exp\left(\sum_{i,j} \lambda_j f_j(i, S, l_i, l_{i-1})\right). \quad (4)$$

Equation 4 defines a linear-chain CRF, using the specific form of feature function introduced in Equation 2. That is, such that feature j of token $s_i$ depends (at most) on its position i in the sequence S, any token in the sequence, its own label $l_i$, the label of the previous token $l_{i-1}$. The summation in the brackets of the exponential may be referred to as a "score" assigned to label sequence L given token sequence S, and the CRF may be said to score each label sequence L for the given token sequence S (the higher the score, the higher the probability). The summation is over all positions in the sequence (i=1, ..., m) and all feature functions (j=0, ... n). N is a normalization factor such that the total probability summed over all possible label sequences, $\mathbb{L}$, is 1, i.e. $\Sigma_{L \in \mathbb{L}} p(L|S) = 1$.

In Equation 4, $\lambda_j$ is a weight applied to feature function j. Each weight $\lambda_j$ is learned in the training process outlined above and described in further detail below. The learned weights encode inferred relationships between the features of the tokens and each token's relevance to the specific user-defined question to which the CRF relates. The explicit dependency on label transitions in the feature functions gives the CRF the freedom to take into account the transitions within the given sequence of labels L when scoring that label sequence for a given token sequence S. For example, depending on the type of data, this might allow the CRF to learn that answers are reasonably sparse (i.e. label values of 1 are relatively rare) and generally clustered together, i.e. that label transitions (0,0) and (1,1) are generally more likely than (1,0) and (0,1).

Given Y label states (for I/O labelling, Y=2) and X observations per token, there can be: Y*Y transition features and Y*X state/observation features. Thus the index in Expression (1) and Equation (4) runs from 1 to Y*Y+Y*X.

An alternative mathematical notation may also be used herein, where the weight associated with a given feature function $f_j$ is instead written as $\lambda_{f_j}$ (it will be clear in context which notation is being applied). Appling the alternative notation, Equation (4) can be re-written—for the two constrained types of feature function of Equations (2) and (3)—as:

$$p(L \mid S) = \frac{1}{N} \exp\left(\sum_{i,y_1,y_2} \lambda_{TR_{y_1,y_2}} TR_{y_1,y_2}(i, S, L) + \sum_{i,x,y} \lambda_{O_{x,y}} O_{x,y}(i, S, L)\right). \quad (4')$$

in which the first sum is over the four possible combinations of label values (0,0), (0,1), (1,0) and (1,1), and the second sum is over all observations $\{1, \ldots, X\}$ and all possible label values $\{0,1\}$.

The first term in Equation (4') gives the CRF the freedom to learn different weights for different label transitions independently of the observations. For example, the CRF could learn that label transitions (0,1) and (1,0) are less probable per se than the label transitions (1,1) and (0,0)—whatever the observations in the second term may be—and capture that knowledge in the corresponding weights of the first term.

The second term gives the CFR the freedom to weight any given observation $g_x(i, S)$ differently depending on whether the current token is (part of) an answer or not, i.e. depending on whether it has a label value of 1 or 0—by virtue of the fact that the observation functions $0_{x,0}$ and $0_{x,1}$ are assigned different weights (recall that $g_x(i, S)$ forms part of the definition of both of those observation functions).

Once the weights for each feature function have been learnt, the model can be used to analyse unlabelled documents.

The set of feature functions $\{f_1, \ldots, f_n\}$ on which a model is defined may be referred to as the "feature set" of the model.

FIG. 3 is a schematic representation of the relationships between tokens, features and label. FIG. 3 uses a tabular format to represent those relationships (note, however, that, unlike the answer tables of FIGS. 2 and 8, the information in FIG. 3 is not generally something that is presented to the user). The left-hand column shows a token sequence S, and the right-hand column shows the corresponding label sequence L. Each row of the table corresponds to a position in the token sequence. The middle n rows correspond to the n feature functions respectively. Each cell of the left-hand row represents a token $s_i$ at the corresponding position i in the sequence S and each cell of the right-hand column represents that token's label $l_i$. Each cell of the column corresponding to feature function $f_j$ denotes feature j of token $s_i$. As noted, each feature is a numerical value which may be weighted in the CRF in accordance with Equation 4, though the numerical values are not shown explicitly in FIG. 3. In FIG. 3, the labels in the right-hand column are ground truth labels, indicating relevancy or non-relevancy of the corresponding token to a specific user-defined question, as determined based on the user's highlighting of the original (underlying) document.

Figure 4:
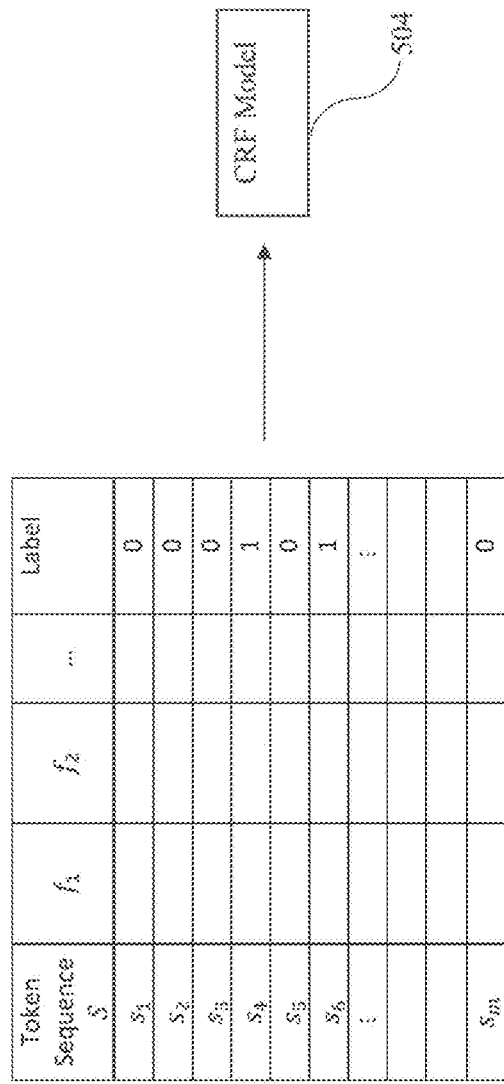
FIG. 4 shows token features and ground truth labels being used to train a data extraction model.

FIG. 4 shows the features and ground truth labels of FIG. 3 being used to train a CRF 504. During training, the CRF 504 operates, in accordance with Equation 4, to predict a label sequence for the token sequence S based on the n features of each token. During training, the weights $\lambda_j$ of the CRF 504 are tuned in order to match the ground truth label sequence L to the predicted label sequence, across a set of training documents. That is, to match the predictions made by the CRF 504 to the ground truth label sequences assigned to the set of training documents based on the user's highlighting. Training of CRFs per se is known and therefore is not described in further detail herein. In this manner the CRF 504 is trained to answer a single user defined question to which the ground truth label sequence L pertains.

With multiple user-defined questions, a separate I/O label sequence is determined for each question, and used to independently train a separate CRF on that specific question (not shown in FIG. 4).

Training is instigated by the end-user who is defining the question(s), as described in further detail below.

Adapters

In order to be able to move between user readable text used in the front-end of the system and the tokens used by the back-end of the system, the relationship between characters of the documents and the corresponding tokens is stored. A "adapter" means a component of the system which maps from characters of an original document to corresponding tokens of a tokenized representation of the document, and from tokens to corresponding characters of the original document (two-way mapping).

A user-uploaded document 100 may be converted, as necessary, from the format in which it is uploaded, for example PDF, to a raw text or html/DOCX representation etc. (in which HTML or other metadata tags may, in some cases, be used to represent document structure, formatting etc.). Note the term "original document" in the following can refer to the converted document, i.e. after such conversion has been applied (e.g. in raw text, HTML or DOCX form, as opposed to a pre-converted PDF), and reference numeral 100 may in that case denote the document after it has been converted. The terms original document and underlying document are used synonymously.

The underlying document 100 is represented as a (potentially long) string of characters, each character having a position in the string. Once tokenized, each token of the document 100 corresponds to a subsequence of characters within the character string. In the simplest case, the relationship between each token and the character string can therefore be stored as two or more of a start position, an end position and a length of the subsequence. The start position is the position in the string of the first character in the corresponding character subsequence, and the end position is the position in the string of the last character in the corresponding character subsequence. The length is the total number of characters in the sequence (character count).

In this manner, each token in a token sequence is associated with a character subsequence of the original document.

There may be two levels of character mapping provided by one or more adapters. This can account for headers, footers and text boxes, for example. In the character string of the underlying document (which, as noted, may be the document representation after document conversion has been applied), text from headers, footers and text boxes may be interspersed with other text in a manner that would be disruptive to document analysis. For example, a token may naturally correspond to a piece of text which spans two pages, separated by a footer. In the character string, this may result in a string of characters, e.g. ABCDEF, where the character sequence AB is on the first page, CD is in the footer and EF is on the second page. The positions of characters ABCDEF in the character sequence are denoted x to x+5 respectively. In most practical contexts, when assessing the token during feature extraction, it is the character sequence ABEF that is pertinent, and CD should be ignored.

For the purpose of mapping between highlighting at the front end and labels in the back end, the token may be mapped to the full character sequence ABCDEF, i.e. the token is mapped to positions x to x+5 in the character sequence. This maintains proper alignment between the sequence of labels and the characters of the original document, which is important both when the user is manually highlighting documents for training/validation and also when extracted answers are rendered in a view of the original document using automatic highlighting.

However, for the purpose of analysis—in particular, when extracting token features—the token is associated with the text ABEF, which is processed as a string of four sequential characters (omitting CD, and treating B and F as adjacent sequential characters). This is also the text that is rendered when presenting this answer in the answer table, i.e. omitting CD from the answer table.

Defining Answers

In order to assign labels to tokens, the user is provided with a front-end user interface which allows him to upload documents, define questions, and manually highlight relevant parts of the documents. The system uses the user highlighted parts to assign labels to the tokens of the document. Some of the labelled documents are used for training and others are used for validation.

A new project may be started by uploading documents for labelling. The user may upload, for example, 100 documents in a document pool, although it will be appreciated that the document pool may consist of more or fewer documents. These documents are the same type of document, and the sub-types of documents should ideally represent the population which the model will be used to analyse. For example, if the model will be used to analyse ISDAs, and the population to be analysed has a split of 30% 1992 ISDAs and 70% 2002 ISDAs, then the training document pool should, in a preferred embodiment, consist of only ISDAs, and have a 3:7 ratio of 1992 ISDAs to 2002 ISDAs. A project may be named according to the type of document that is to be analysed and converted into useful data, however any name may be chosen. The user defines the name of the project.

Once uploaded, the documents are converted as necessary into useable character strings in the manner set out in the previous section.

The system supports four types of question which can be asked of documents, once a model has been trained. These question types are:
1. Point extraction (for words or short phrases)
2. Section extraction (for sentences or paragraphs)
3. Logic flows (for example of "if 'X' then 'Y'" type)
4. Table extraction (for text found in table formats).

The user defines a question and chooses documents from the document pool which he selectively highlights to indicate answers to that question. The user's highlights are used, in turn, by the backend system to assign ground truth labels to tokens of the document as described above.

In one training strategy, a subset of the labelled documents (first training set), for example 30 of the documents, is used to train the model specific to that question. Once the model has been trained, the system runs a validation analysis on the remaining labelled documents (first validation subset). In the validation process, the trained model is applied to the documents in the validation set to assign predicted labels to each document. The accuracy of the trained model can then be characterised based on a comparison of the predicted labels and the ground truth labels of the first validation set.

If the accuracy of the model is insufficient, a second training set may be defined and used to train a new model, with the current model being discarded. For example, the user may add an additional 10 of the labelled documents to the training set, giving a second training set of 40 labelled documents, and a validation set of 60 remaining documents. The accuracy can then be assessed in the same way and presented to the user, who can continue as needed until an acceptable level of accuracy has been achieved. Additional documents may be uploaded to be included in the training document pool if required. It will be appreciated that the number of documents used here are examples, and any suitable number of documents may be used in each training and validation set, as defined by the user.

The above training strategy is not compulsory; the user is free to choose his own training strategy. The described training strategy is not necessarily the most rigorous training strategy that could be chosen from a scientific perspective, but on the other hand is intuitive to a non-technical user and has been found to give acceptable performance in practice. Nevertheless, the user may adopt a more rigorous training strategy, and a non-technical user may be provided with appropriate guidance as needed.

In the end, after iterating to a satisfactory accuracy as described above, a user will (and should) use all the available documents for training a model to then be put in "production". Cross-validation is the most accurate way of evaluating how this might actually perform as it allows exploring the contribution of all the labelled examples, over the k-fold iteration. In k-fold cross validation, a set of labelled examples is split into k subsets ("folds"). One fold is selected as a test set, the model(s) are trained on the remaining k−1 folds and the trained model(s) are evaluated on the test set. This process is repeated using different folds as the test set, and training on the rest. Options may be provided via the user interface for performing cross-validation on the annotated documents that the user has created. One or more cross validation scores may be provided via the UI for the user to assess.

In some implementations, multiple models may be trained for at least one question type. These could use different tokenization, different features and/or different labelling schemes. The performance of the trained models can then be assessed, for example by comparing their cross-validation results, in order to select a best performing model for a particular question.

FIG. 1 shows a first example of a user interface during a manual document highlighting process. The user selects a first document 100 for labelling from the training document pool. When the user uploads documents to the system, the user can define a document ID 102 for each document. This allows the user to identify each document.

In an answer defining process, the user highlights a part 104 of the document 100 which is an answer to a user defined question (strictly speaking, in the above terminology, the answer is the token(s) which correspond to the highlighted part of the text. However, in the interests of conciseness, the user-highlighted text of the original document may also be referred to as an answer. This applies to similar terminology such as extracted points and sections. The meaning will be clear in context).

The highlighted part 104 of the document 100 is associated with a question for which a model is to be trained. When a user highlights a part 104 of the document 100, a question definer 112 is provided to the user. The question defined 112 is a graphical element of the GUI comprising a drop-down menu which provides a field into which a user can type the name of the question in human readable text or select a name of a question from the drop-down menu which has already been used for defining answers in the document 100 or any other documents in the same project. This name may, for example, relate to the question which the highlighted part 104 answers. This name will be referred to in the following as a question identifier 106. Thus, the user can create and enter their own question identifiers 106 based on his document. In the example of FIG. 1, a part of the text "Skytel Systems" has been highlighted. The drop-down menu allows the user to choose the question identifier 106 to be inserted. In this example, the highlighted part 104 refers to the "Party A" question identifier 106. This is an example of a point, which will be used in point extraction.

The user also selects the question type 108 from a second drop-down menu of the question definer 112. The different types of questions are set out above. The system may provide the user with a suggested question type based on the length of the highlighted part 104 or the location of the highlighted part. In the example of FIG. 1, the highlighted part 104 is 2 words long. As such, point extraction is the question type 108 which is best suited to extracting the required information. The user may choose a different question type 108 to that suggested by the system. In some embodiments, the system does not suggest a question type 108. In such embodiments, the user must choose the question type 108 from the drop-down menu. In other embodiments, the system defines the question type 108 based on highlighted part 104 length and/or location in the document 100, and the user cannot input a different question type 108.

Although the system may suggest one of point and section extraction based on word length, this is intended an intuitive guide, not as a fundamental distinction between points and sections. The user can select any question type he sees fit, and there may be occasions when the system happens not to suggest the optimal question type. In most practical contexts, this is expected to be a relatively rare occurrence, hence the system is able to make sensible suggestions based on a simple word length threshold (e.g. 10 words or less—point extraction; otherwise section extraction).

Once the question identifier 106 and question type 108 for the highlighted part 104 have been defined, the user selects the 'create field' user selectable object 110 to create the association between the question and the highlighted portion in the document 100. The defined information is used by the system to label the relevant tokens. That is, the tokens associated with the highlighted part 104 are assigned a label indicating that they are an answer to the question, so assigned a ground truth of value 1.

A second example of the user interface during an equivalent answer defining process is shown in FIG. 10. A part of the text "Global Loan Agency Services Limited" has been highlighted and the drop-down menu has allowed the question identifier "agent" to be inserted. FIG. 10 also differs from FIG. 1 in that the user interface of FIG. 10 omits the drop-down menu for question type 108 and the selectable object 110 (at least initially). The user may not be required to define the question type 108 when he highlights the part of the text. This may be because the user defines questions via a different display or different part of the display, such that he need only provide the question identifier which has already been associated with a question type. Alternatively, the system may define the question type automatically based on the length or location (e.g. if in a table or not in a table) of the text highlighted by the user.

The user may choose to identify multiple answer for a single question within the same document. That is, the user may highlight multiple parts 104 in a single document, all of which answer the same question, so are assigned the same question identifier 106.

The process of defining answers in the document 100 can be repeated for both the same and different question identifiers 106. There may be multiple question identifiers 106 applied to a single document 100, such that the highlighted parts 104 in a single document 100 can be used to train multiple models, where each model answers a different question. The different questions may be of the same or different types.

Although FIGS. 1 and 10 show an example of defining answers for a point extraction question type, such that the highlighted part 104 is short, it will be appreciated that the same techniques may be applied when defining answers for section extraction or table extraction questions. In these cases, the highlighted part 104 will be longer, for example, a clause of a legal document, referred to a 'chunks' of text, or in a table respectively.

Multiple question identifiers 106 may be applied to a single word in the text, such that the corresponding token is labelled as relevant to more than one question. That is, the ground truth for a single token is 1 for more than on question. This may occur, for example, when a word or phrase is an answer to a point extraction question and also forms part of a chunk of text which answers a section extraction question. As noted, a separate label sequence will be assigned for each question and used to independently train a separate model.

After the answers contained in a first document 100 have been appropriately indicated by the user, the answers in a second document are indicated in a similar manner, and so on. There may be some documents in which an answer to one or more of the user defined questions does not exist, and in that case, it is possible for the user to enter into a tabulated format in the user interface "no answer". A document which has no answer for a particular question may not, in some embodiments, be used to train a model associated with that question. Part of the reasoning for this is that, generally speaking, documents which does contain answers will implicitly provide sufficient negative examples, i.e. tokens with label values of zero, because generally speaking, answers are relatively sparse.

Figure 2:
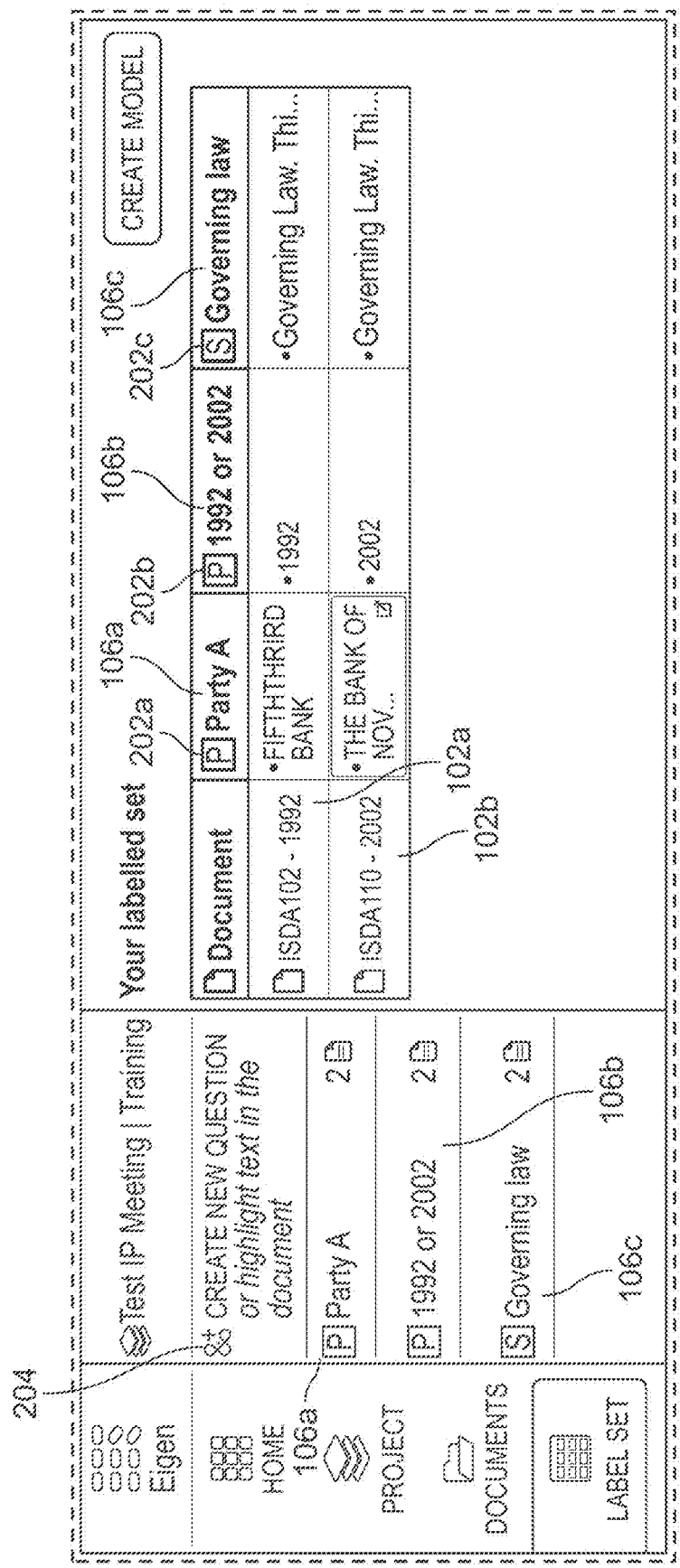
FIG. 2 shows an example of a table rendered in a graphical user interface to show ground truth answers to user-defined questions.

FIG. 2 shows a view on the user interface of a table demonstrating the tabulated format presented to a user which illustrates the answers which have been identified by the user. In this example, the question identifiers 106a, 106b, 106c are:
Party A
1992 or 2002
Governing law The question identifiers 106a, 106b "Party A" and "1992 or 2002" are associated with examples of point extraction questions, and the question identifier 106c "Governing law" is associated with an example of a section extraction question type.

The question type 108 is visualised to the user by question type indicators 202a, 202b, 202c which represent the question type 108 associated with the question identifier 106a, 106b, 106c.

The table of FIG. 2 comprises three columns, representing the three question identifiers 106a, 106b, 106c, and two rows. Each row represents a single document 100 in which answers have been defined by the user. The documents 100 are identified in the table by their document IDs 102a, 102b. Each row comprises the data relating to the highlighted parts 104 associated with the corresponding question identifier 106a, 106b, 106c in a single document 100, such that the extracted text for each question identifier 106a, 106b, 106c has been identified and inserted into the table view shown in FIG. 2.

The question identifiers 106a, 106b, 106c are also displayed to the user in a sidebar. There is a visual indicator associated with each question identifiers 106a, 106b, 106c in the sidebar which indicates how many of the documents 100 in which answers have been defined contain answers to the associated questions, i.e. how many documents 100 have highlighted part 104 associated with each question identifiers 106a, 106b, 106c.

Although not shown in FIG. 2, there may also be an indicator associated with each question identifier 106 which indicates how many times said question identifier 106 has been applied to the documents, i.e. how many answers to each question have been identified in total.

It is also possible to create new questions via the user interface shown in FIG. 2. That is, the user does not have to be in an answer defining view, as shown in FIGS. 1 and 10, to generate a new question.

For example, there is provided, in the labelled set view shown in FIG. 2, a "create new question" user selectable item 204. The user may select this item 204 and define the question identifier 106 and question type 108 of a new question. The user can then select the parts 104 of the documents 100 which correspond to this question in the document labelling view of FIG. 1 or 10.

It will be appreciated that the user may define the questions via another view of the system. For example, there may be an option to define questions on a view in which all of the uploaded documents are visualised to the user or in a question defining view. There is no requirement that the user creates a first question in the answer defining view, nor that any questions need to be defined in the answer defining view. Questions may be defined in different views. Additionally, the user may define new questions after he has defined answers in one or more documents 100. He may choose to identify answers to the new question in the documents 100 in which answers have already been identified, or he may choose not identify answers for the new question in said documents, in which case he can choose not to use those documents 100 when training the models for the new questions. The user may also define answers in previously labelled documents with answers for a new question after the documents have been used to train models for the previously defined questions.

Once answers have been identified for a training set of documents, and the ground truths assigned to the tokens of the document as defined by the defined answer, a model is defined in a core engine of the system for each question. That is, a model is defined for associated with the question identifier "Party A", a separate model is defined associated with the question identifier "1990 or 2002" and a separate model again is defined associated with the question identifier "Governing law".

The user can determine which of the user defined questions to create a model for. He can also choose which of the labelled documents 100 to use to train each model. In some cases, there may be labelled documents 100 which do not contain answers to a particular question. In some embodiments, these documents are not be used to train the model for that question. That is, the model is not trained using negative examples, i.e. a document that does not contain an answer for that question.

The user can easily see the answers which he has defined. He can select and answer form the table of FIG. 2, which opens the relevant document in the labelling view of FIG. 1 or 10, highlighting the selected answer to the user. Also, in the labelling view, there is a question sidebar presented to the user, as can be seen in FIG. 10. This comprises a list of all of the questions. The user can select a question form the question sidebar and the relevant portion of the document is displayed to the user, with the answer highlighted.

For example, the user selects the question 'Q2: Party A?' in the question sidebar. The document is moved such that the user is presented with, for example, the page on which the answer to the selected question has been identified. It will be appreciated that a smaller or larger portion of the document may be displayed to the user. The answer is highlighted, such that the answer is easily identifiable by the user.

As each token has been given a binary indication as to whether or not it forms part of an answer to the question, a large training data set can be established from the documents. This is because of the large number of tokens that do not form part of the answer for each document, such that each document will provide a large number of tokens for which a label of 0 is applied. It is thought that this may be is one reason for the CRF models of the present system being able to be trained on a small number of training documents (or at least a contributing factor).

Before describing the details of the features and tokenization employed for different question types, a general observation is made that the described system has a unique combination of features compared with commercial document extraction systems in use today:

- it provides blank data extraction models, which end-users train themselves, via a GUI that is accessible to non-technical users;
- the blank model is generally applicable, and not architected or pretrained to any specific document type (it only becomes specific to a document type once an end-user has trained it);
- the same form of model is used for different question types, with models for different question types differing only and features and tokenization;
- inherently complex ML functions, such as training and validation, are rendered accessible to non-technical users though a simple and intuitive GUI.

This is in contrast to the prevailing approach in the industry, which tends to focus on models pre-trained on large data sets, and adapted to specific tasks by a solutions engineer. Nevertheless, the present system has been designed to perform effectively even when limited training data is provided. The large number of tokens to which a value of 0 is assigned by the user may contribute to this. Another possible reason is that, in many practical data extraction applications, different documents will have significant overlap in the terminology they use. This is particularly true of documents containing legal terminology which tends to exhibit a high degree of consistency across documents of a particular type, as such language is often derived from common statues, guidelines, precedents etc. The amount of training data required relates to the regularity of the documents. However, the use of the present system is not limited to such scenarios and can be applied effectively to less regular documents (but may require more training data in that event).

As discussed above, there are four different types of question types: point extraction, section extraction, logic, and table extraction. Each of these question types will be discussed in further detail.

Point and Section extraction all use the same form of linear-chain CRF defined in Equation 4, but with different tokenization. Logic questions are quite different, as described later.

Point Extraction

FIG. 11 shows point extraction applied to various documents, in which each extracted point is shown as a highlighted word or short word sequence within a longer passage of text.

When documents are tokenized for point extraction, the document is divided into words, and each word is represented by a token. That is, the document is tokenized at the level of individual words. The document, therefore, is represented by a sequence of tokens, S, where each token generally corresponds to a word (though a few tokens may instead represent punctuation, formatting etc.). The term word token is used to refer to a token obtained by tokenizing at the level of individual words, noting that some word tokens may in fact correspond to punctuation, formatting etc. and not actual words. More generally, a token in the context of point extraction is referred to as a point token.

With reference to FIGS. 3 and 4, in the context of point extraction, each token $s_i$ is a point token in the above sense. Hence, the transition functions of the feature functions have an explicit dependence on the label transitions between adjacent point tokens. In other words, when applying a CRF to a document tokenized at the word level, transition feature j of token $s_i$ depends on the label of the current and previous word token, as well as the words themselves.

During the answer defining process described above, each word token is assigned a ground truth label, as determined by the user's highlighting of the text. The corresponding sequence of labels, L, is a sequence of word token labels, indicating which of the words of the documents form an answer to the point extraction question, as defined by the user. The sequence of labels is associated with the question identifier 106 defined by the user during the answer defining process.

An extracted point comprises a word token or multiple word tokens assigned a label value of 1 by a point extraction model at inference. An extracted point is an answer to a question of the point extraction type. A point may comprise a single word token if the answer is a single word, or it may comprise multiple word tokens if the answer is more than one word. Examples, of extracted points are shown in FIG. 11.

For point extraction, the observation functions $g_x(i, S)$ are evaluated for each word in the document, since each word is associated with a token. Some observation functions are categorical, e.g. binary, such that the feature is either a 1 indicating the feature function is true for the token or a 0 indicating the feature function is false for the token. Other observation functions are numerical. For numerical observation functions, the following steps may be implemented: a categorical variable in converted to a set of binary variables. For example, for a variable "colour" which can take values [red, green, blue], a set of binary features are created, e.g. "is it red?", "is it green?", "is it blue?". This transforms a categorical variable with N possible values to N binary variables. Some examples are given below. Note that N could be a very large number in practice, as in some of the examples below.

Note that the term feature may be used below both in the strict sense but also less formally to refer to an observation. The meaning of the term will be clear in context.

Observation functions may be evaluated for the tokens as follows (converting non-binary categorical variables to binary variables as necessary):

the lowercase form of the token text. For example, the set of all N lowercased tokens found in the entire training set. The set of binary features is of the form: Is lowercased word "word_n" the same as the lowercased word at token "i"? In practice, this can result in a very large number of binary observations pertaining to the lowercase form of the text.

the word shape, e.g. capitalisation, punctuation, digits. For example, the shape for a token "Word_5", for example, would be "Xxxx_d". That is, the punctuation stays the same, the digits are all converted to "d" and the letters to "X" or "x" depending on upper/lowercase. All shapes are collected from the training examples and a binary variable is created for each (which, again, could result in a large number of binary observations pertaining to word shape).

is the token text lowercase?
is the token text uppercase?
is the token text titlecase?
is the token punctuation?
is the token a digit?
does the token text resemble a number?
is the token a stop word?
is the lexeme out-of-vocabulary?
part-of-speech tag
IOB (inside, outside, beginning) code of named entity tag
Syntactic dependency relation. For example, there may be a set of possible dependencies between the current token and its syntactic HEAD. These features are of the form: Is the token related to its head by dependency 1? Is the token related to its head by dependency 2? Etc.
the word that is syntactic parent of the current token
named entity type
token position percentile in text (binned between [0-0.25-0.5-0.75-1] of the full document length)
regex (regular expression) features—date regex defined to match the variations of date formats. For example, the binary variable is: "does the regular expression match the token?".
keyword features—features generated based on the presence of the 30 most common keywords and bigrams found in a window of +/−10 tokens around the labelled answers. For example, there exists a set of K keywords. There are, therefore K binary features from this group, the binary feature defined by the question: "is the kth keyword found in a window around the current token "i"?
window features—one or more features may be extracted for a given token in dependence on the feature(s) of the tokens in a window region around that token, e.g. +/−W. That is, a particular feature of token $s_i$ may depend on one or more features of tokens $s_{i-W}, \ldots, s_{i-1}, s_{i+1}, \ldots, s_{i+W}$.

The above point extraction feature set has been found to give good point extraction performance over a range of practical document types. However, the invention may be implemented effectively with different feature sets.

In some implementations, the above feature set or a similar feature set may be provided as a baseline feature set for point extraction. Multiple point extraction models, with different feature sets and/or different labelling schemes may be provided. In that case, multiple point extraction models may be trained on each point extraction question and evaluated to select a best performing model.

Section Extraction

FIG. 12 shows section extraction applied to various documents, in which each extracted section is presented in context through automated highlighting of the original text.

When documents are tokenized for section extraction, the document is broken down into "chunks" of text, and each chunk is represented by a token. A chunk may, for example, be a sentence, a paragraph, a clause, or a sub-clause of a document. The chunks may be defined such that they correspond to the format of the document. For example, chunks may not carry over from one part of the document, such as a chapter or sub-chapter, to another or from one paragraph to another. In some embodiments, all chunks of text are terminated by a full stop. In general, at least some chunks will contain multiple words.

The term section token is used to refer to a token in the context of section extraction, where a section token may correspond to a paragraph, sentence, clause etc. depending on the precise form of tokenization applied. In the context of section extraction, an extracted answer is referred to as an extracted section. An extracted section takes the form of one or multiple section tokens assigned a label value of 1. That is, a section may comprise a single section token or it may comprise multiple section tokens. Examples of extracted sections are shown in FIG. 12.

When applying a CRF to section tokens, feature j of section token $s_i$ therefore depends on the label $l_i$ of the current section token and also the label of the previous section token $l_{i-1}$. This gives the CRF some additional flexibility to take into account "larger-scale" patterns and structure within the document (as compared with point extraction which tokenizes at the word level).

During the answer defining process described above, each token in the sequence of tokens is assigned a ground truth label, as determined by the user's highlighting of the text. The highlighted chunk of text is assessed to determine which predetermined sections of the document 100 it overlaps with. A user may have highlighted text corresponding to one or more entire section tokens, but it is also possible that the user's highlighting may only partially encompass the text corresponding to a particular section token (i.e. only some of the characters corresponding to the section token may be highlighted). This may be addressed by assigning a ground truth label of 1 to any section token whose corresponding characters are completely or partially highlighted.

The corresponding sequence of labels, L, is a sequence of ground truth section token labels (i.e. labels assigned to section tokens), indicating which of the section tokens of the documents form an answer to the section extraction question, as indicated by the user. The sequence of labels is associated with the question identifier 106 defined by the user during the answer defining process.

For section extraction, feature functions are evaluated for each chunk of text, as each chunk is represented by a single token. Since each chunk comprises multiple words, the feature functions evaluated for section extraction are different to those evaluated for point extraction. The feature functions in the case of section extraction take into account all of the words in the chunk.

One example of a section extraction feature function is a keyword feature function. Here, a word or phrase is identified as being associated with a question, such that a chunk containing the identified word or phrase is an answer to the question. For example, a particular key phrase, "Governing Law", might be identified, and then the token labelled according to whether or not the word "Governing Law" appears in the section. That is, the token is assigned a feature value of 1 if it contains "Governing Law" and a feature value of 0 if it does not.

Another type of section extraction feature function is a count feature function, which counts the number of words of a certain type in the chunk. For example, a count feature function might evaluate the number of words in the chunk which are in the category of "Noun". The total number of nouns for each section is the feature. The number of the following word types in each chunk may be counted:
 Adjectives;
 Adverbs;
 Interjections;
 Nouns;
 Proper nouns;
 Verbs;
 Organisations;
 Times (smaller than a day);
 Geopolitical entities;
 Laws;
 People;
 Monetary values;
 Facilities (e.g. buildings, airports, highways, bridges); and
 Dates.

As can be seen from the above, that the features of a token sequence can depend on its constituent words. In order to evaluate the applicable feature vectors, a second layer of tokenization may therefore be performed in the context of section extraction, at the word level, to enable the word types to be counted or otherwise analysed in feature extraction. The second layer of tokenization feeds into the feature extraction process, but once that has been performed to assign features to section tokens, the section extraction CRF of Equation 4 operates on section tokens.

Word types may be identified, for the purpose of extracting section features, using one or more pretrained models of any kind (neural networks, pretrained CRFs etc.), rules-based analysis etc.

The term "topic" is used herein not in its usual descriptive sense but rather to refer to a word distribution associated with a given section token. A word distribution can for example be represented in terms of counts of particular words (e.g. keywords) or word types (e.g. those listed above). Introducing word counts as features, or as a basis for extracting features, allows the CRF to take into account topics of section tokens and, in some cases, the relationship between topics of different section tokens.

Additional section extraction features are extracted as follows:

A tfidf (term frequency-inverse document frequency) model may be used which weights words within the section based on their relative importance. Such models can be pretrained on representative training sets. The dimensionality of the tf-idf model is reduced using PCA (principle component analysis).

One or more LDA (Latent Dirichlet Allocation) models or other topic extraction models to determine topics of sections (in the above sense). For a given section, such a model provides a distribution across topics. The corresponding features (one real-valued feature per topic) are the proportions (in a probabilistic sense) of the section allocated to each topic. These models can be pre-trained in the above sense.

A measure of similarity between section tokens, e.g. the current token and the previous token (the value for the first token in a document is 0). For example, if word vectors (embeddings) are present, this may be computed by finding the average word vectors for each section token, and taking the cosine between them.

An average "topic distribution" under the LDA models for the section tokens with positive labels: for each section token, compute a measure of divergence between its LDA topic distribution and that average.

Keywords in the section tokens with positive labels (label value 1) can be learned dynamically based on an analysis of their constituent words, and the system then checks whether or not they are present in each section. That is, keywords relevant to relevant sections can be learned from the labelled sections themselves (rather than being predefined).

The number of instances of each of several parts of speech and entity types are counted. For example, the number of adjectives, adverbs, interjections, nouns, proper nouns, verbs, organisations, times, geo-political entities, laws, people, currencies, facilities (buildings, etc), and dates may be counted. The feature may not the raw count itself, but is based on the raw count.

For some of the above features, the system also looks at the feature values for tokens within a predetermined window of the current section token (i.e. in a window of size W around the current section token). E.g. for each section token, a feature assigned to section token $s_i$ may be the value for the kth topic in a particular LDA model for the section token $s_{i-W}$.

The above feature set has been found to perform effectively for section extraction across a range of practical document types. However, the feature set is not exhaustive and the invention can be implemented with different feature sets.

In some implementations, the above feature set or a similar feature set may be provided as a baseline feature set for section extraction. Multiple point extraction models, with different feature sets, different labelling schemes and/or different levels of tokenization (e.g. sentences vs. longer sections) may be provided. In that case, multiple section extraction models may be trained on each section extraction question and evaluated to select a best performing model.

In the context of FIGS. 3 and FIG. 4, each token $s_i$ is a section token.

In a similar manner to in point extraction, a sequence of labels is defined for the document 100, one for each section token, using I/O labelling. The label of each token is based on whether the highlighted part 104 defined by the user overlaps with the token. Note that the label still pertains to a single question entered by the user (in this case, of the section extraction type), such that the sequence of labels is associated with a single document and a single question.

Table Extraction

Data may also be extracted from tables within a document.

In order to perform table extraction, a list of tables is created from the document 100. Tables are identified by an html tag, which indicates that the item is a table. Any item with a table html tag is kept for the purpose of generating the list of tables, while the rest of the document, that is the main body of text, is removed. This list of tables effectively becomes the document on which table extraction is performed.

The relevant tables are identified from the list of tables. At this step of the process, each table is represented by a token. Relevant tables are ones which contain data to which labels have been applied.

Once the relevant tables have been identified, the relevant cells are identified from the list of tables. At this step, each cell is represented by a token.

For both steps set out above, the CRF model is used to identify the features which correspond to the relevant tables and cells respectively, with separate feature sets and tokenization applied to each step. This is similar to the process performed for both section and point extraction, as set out above.

Logic

The user may define logic type questions. These are conditional questions which use the extracted data from other user defined questions to provide the user with answers in a more useful format by specifying the answers given. The model used for a logic question does not itself answer the logic question. Instead, the data extracted using the model is input into the logic and the relevant answer presented to the user. In some cases, there may be multiple models used to answer a single logic question.

There are two types of logic questions: pure logic and dependency logic.

Figure 6:
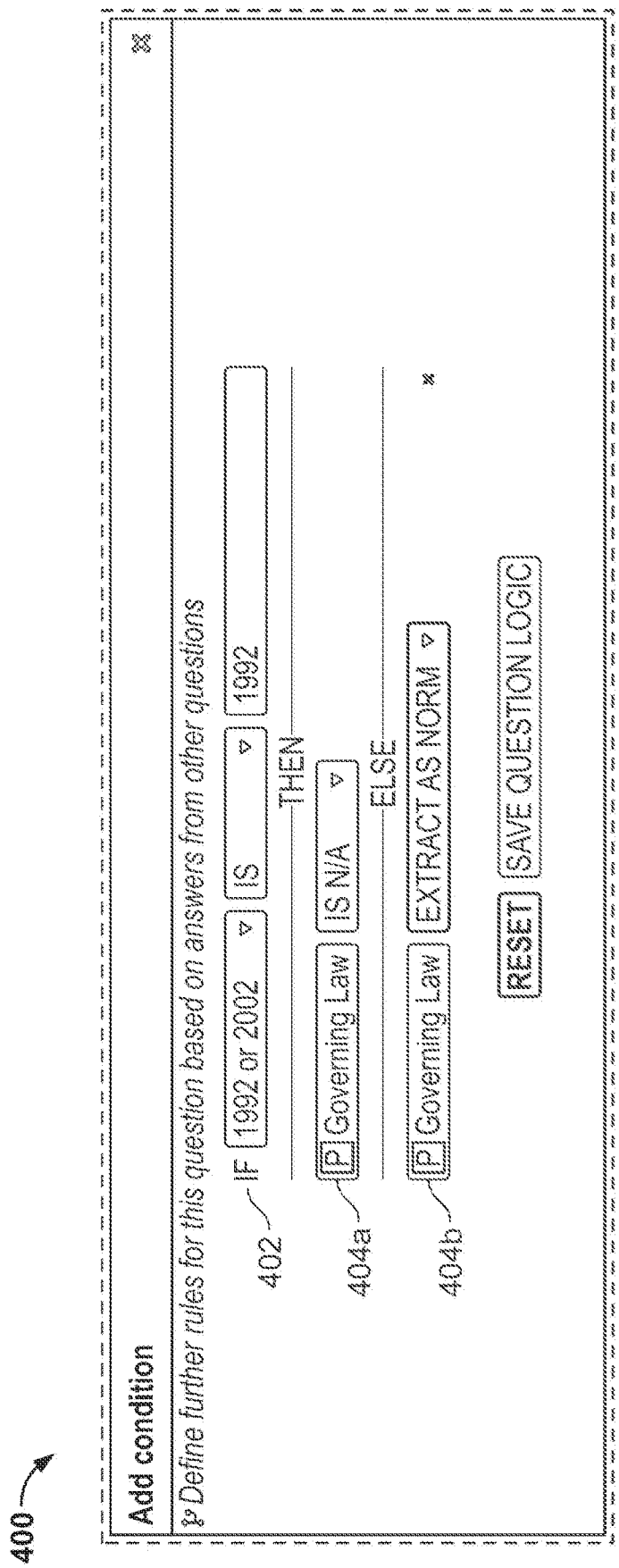
FIG. 6 shows an example of a user interface for defining a logic question.

FIG. 6 shows an example of a logic defining user interface 400. In this example, the logic question relates to Governing Law. The user defines the labels associated with the question in the same way as with other question types, that is, the user highlights parts 104 of the training documents 100, chooses the question type 108 and defines the question identifier 106. Here, the question type 108 is not logic, but rather the appropriate form of extraction, i.e. point, section, or table extraction. The user will not, however, be presented with all of the extracted data relating to the question when the analysis is run. Instead, he will be presented with the relevant results as defined by the logic question. The extraction of answers using the CRF model is independent of the logic.

The user defines a condition 402 for the logic question, which relates to one of the predefined questions. That is, the condition 402 relates to one of the other questions which has already been defined by the user. The user chooses this question from a drop-down list of the pre-defined questions. In this example, the user has chosen the question 'Q1: 1992 or 2002?'. The models for the questions do not have to have been generated prior to the creation of the logic questions. The user continues to define the condition 402 by generating a conditional statement relating the chosen pre-defined question to a label relating to the logic question. In the example of FIG. 6, the user has defined the condition 402 to be 'If Q1:1992 or 2002? is 1992', where '1992' is one of the labels of the chosen pre-defined question.

The user then defines logic answers 404a, 404b. The first logic answer 404a defines the answer presented to the user when the model analyses documents for when the condition 402 is met. Here, the user has defined the first logic answer to be 'is N/A'. The user can input a desired answer in a human readable text format, as in this example, or he can choose an answer from a drop-down list.

The second logic answer 404b defines the answer presented to the user when the condition 402 is not met. In this example, the user has defined the second logic answer 404b to be 'extract as normal' from the drop-down list. When the user is presented with the analysis results generated by the model, if the condition 402 of this logic question is not met, the user will be presented with the data which would have been extracted had there not been a condition 402 defined for the question. For example, if the label is found to be '2002' then the user is presented with the answer to the 'Governing Law?' question, for example 'State of New York'.

This is an example of dependency logic. That is, one or more answers presented to the user for the logic question 'Governing Law?' comprises extracted tokens.

Pure logic questions differ from this in that the answers presented to the user do not comprise any extracted data. Instead, the answers are user defined text answers. For example, if the logic question is 'Is this valid in the UK?', the condition 402 may be 'if 'country?' is UK', and the logic answers 404a, 404b defined as 'YES' if the extracted answer to 'country?' is UK, and 'NO' if the extracted answer to 'country?' is any other country. Such pure logic questions may be defined by a user in the same way as dependency logic questions, using the user interface as shown in FIG. 6.

The logic question may contain a condition 402 which relates to more than one pre-defined question. For example, the condition 402 may be defined to require that a first pre-defined question has a first label and/or a second pre-defined question has a second label for the condition 402 to be met.

Moreover, the logic question may comprise more than one condition 402. For example, the user may define a logic answer 404 for each possible label of the pre-defined question, such that multiple conditions are defined.

It will be appreciated that there may be more than two logic answers 404a, 404b defined by the user.

Prediction

Once the models have been trained, the system may be used to predict answers from other documents. Other documents are uploaded, and can each be analysed. The trained model is used to generate a sequence of labels, L, associated with the sequence of tokens, S, of a document which has not be labelled by the user.

Figure 7:
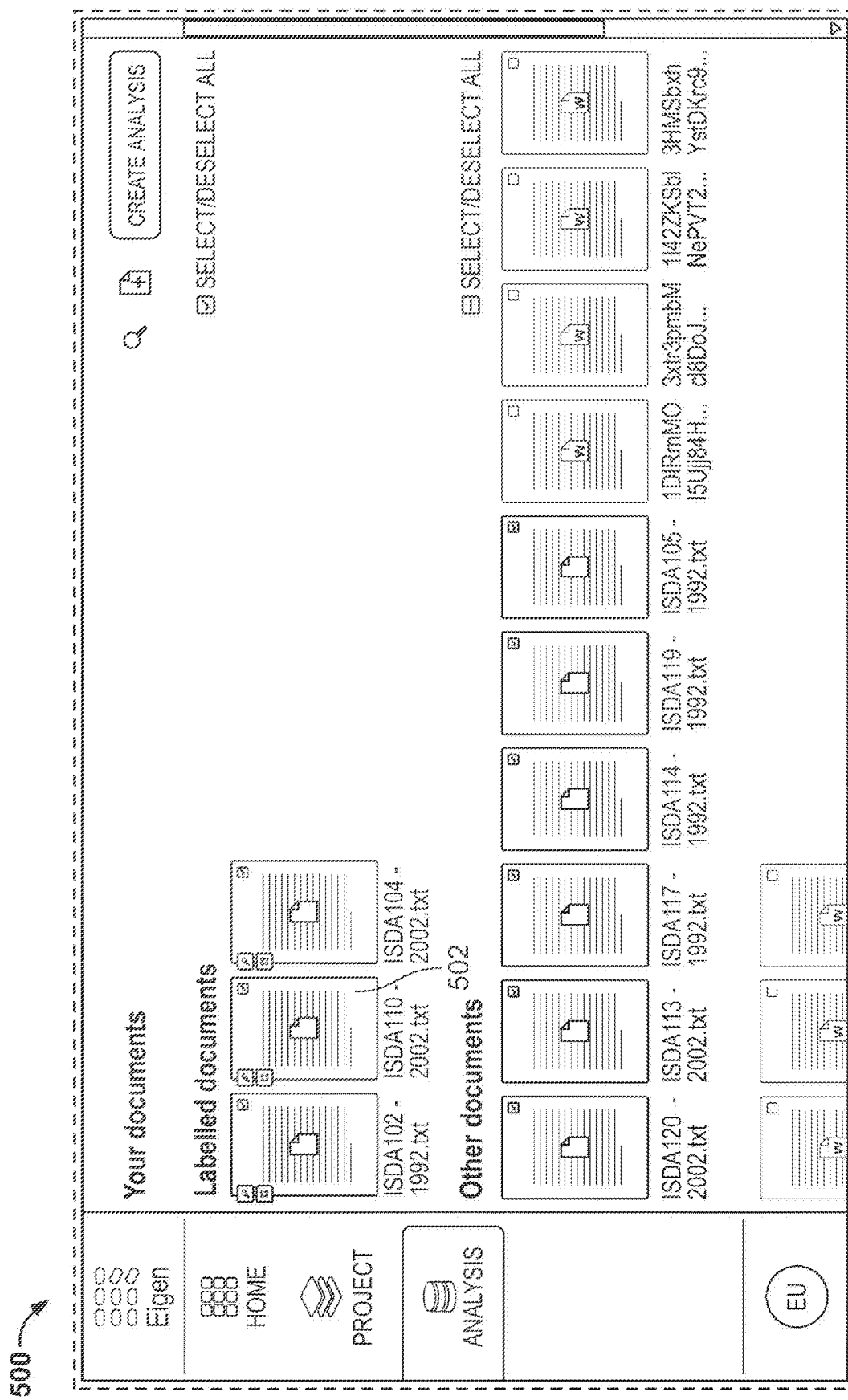
FIG. 7 shows an example of a user interface for selecting documents to be analysed by a trained model.

FIG. 7 shows an example of an uploaded document user interface 500. Here, icons 502 associated with each of the documents which have been uploaded by the user into the project are displayed to the user. The documents are split into labelled documents, that is, documents 100 which have been labelled by the user as described above, and unlabelled documents.

The user selects which of the uploaded documents he wishes the models to analyse. In this example, the user has selected all of the labelled documents 100, and six unlabelled documents. The user has chosen not to select a further seven unlabelled documents. It will be appreciated that the user may select any combination of labelled and unlabelled documents for analysis.

An indication of selection of a document is presented to the user on the uploaded document user interface 500. In the example of FIG. 7, the icons 502 associated with the selected documents have a coloured border around them. They also have a small box in the top right-hand corner which has been ticked. It will be apricated that other indicators may be used.

To perform the analysis, the model for each question is executed against each of the selected documents. Each model uses the evaluated feature functions for each document to predict the sequence of labels of the document.

Figure 5:
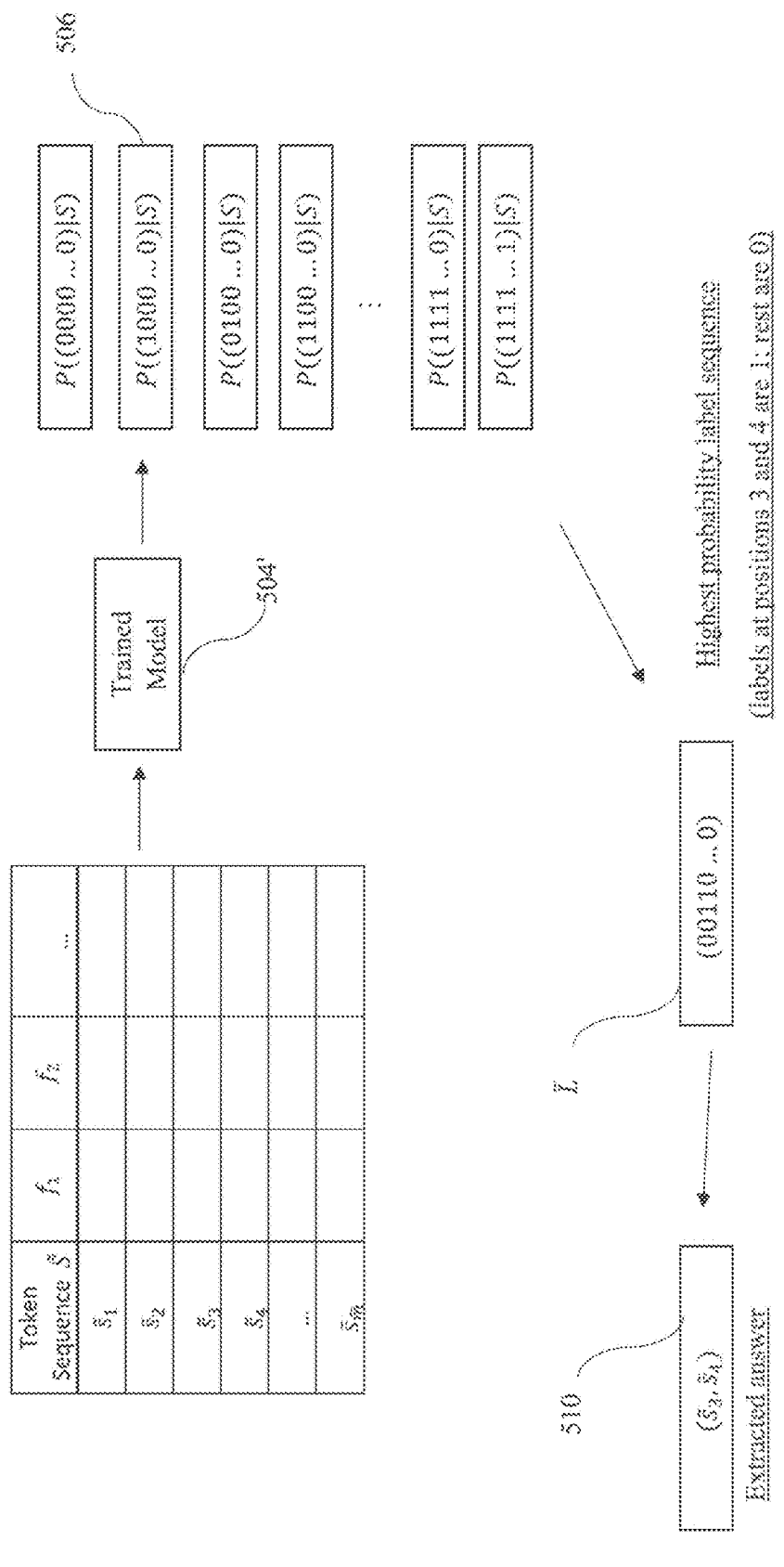
FIG. 5 shows a trained data extraction model applied to an unlabelled token sequence in order to extract an answer to a user-defined question on which the model has been trained.

FIG. 5 shows an unlabelled document in tokenized form. The n features of each token are determined as used as inputs to a trained CRF 504', which in turn provides a predicted (inferred) label sequence for the tokenized document.

FIG. 5 uses the specific notation $\tilde{S}=(\tilde{s}_1, \ldots, \tilde{s}_{\tilde{m}})$ to denote an unlabelled token sequence of length $\tilde{m}$, to which the trained CRF 504' is to be applied at inference, and $\tilde{L}$ to denote the label sequence predicted for that token sequence $\tilde{S}$ (as noted, elsewhere in this document, the mathematical notation does not explicitly distinguish between training and inference in this way). The trained CRF' still operates in the same way in accordance with Equation 4 at inference, but applying the weights $\lambda_j$ it has learned during training.

The trained CRF 504' is applied to the token sequence $\tilde{S}$. The trained CRF 504' identifies which sequence of labels has the highest probability 506 of being correct, as per Equation 4. This predicted label sequence $\tilde{L}$ is provided on the basis that it has the highest probability of being correct, i.e. the highest $P(\tilde{L}|\tilde{S})$ out of all possible label sequences. Purely by way of example, this is shown in FIG. 5 to be the label sequence with label values of 1 at positions 3 and 4 in the sequence and zero elsewhere. For example, the Viterbi algorithm may be used to find the highest probability label sequence. The CRF does not necessarily compute $P(L|S)$ for every possible label sequence.

An extracted answer 510 thus the form, as applicable, of a single token or subsequence of tokens have label vales of 1—in this example, the extracted answer 510 consists of the tokens $(\tilde{s}_3, \tilde{s}_4)$ at positions 3 and 4 in the sequence $\tilde{S}$.

The extracted answer 510 can be mapped back, as necessary, to the corresponding characters of the original document as above (not shown in FIG. 5).

Answer Forcing

A possible outcome in any type of extraction is that the CRF fails to find any answer in a given document at inference. In terms of the model details, this means that the highest probability label sequence is all zeros, i.e. $P((0,0,0, 0,0 \ldots )|S)$ is higher than $p(L|S)$ for any other label sequence, according to the trained CRF 504'.

However, this is not necessarily taken to be the final answer.

In such a case, "answer forcing" is used to attempt to identify tokens of the document which are relevant to the question, as an alternative prediction mechanism.

For certain documents, an answer to a given question might not be present, but it is assumed that this is true only in a minority of cases.

Answer forcing overrides the initial "no answer" prediction of the CRF 504', by applying the laws of probability on the basis of this assumption as follows. A CRF fundamentally operates on the notion of the probability of a whole label L sequence being correct for a given token sequence, i.e.

$P(L|S)$.

Answer forcing, instead, asks "what is the probability that the token $s_i$ at position i is relevant (i.e. has label value $l_i=1$), irrespective of the relevance/non-relevance of the other tokens", i.e.:

$P(l_i=1|S)$

This is estimated for every possible token position $i= 1, \ldots, m$. $P(l_i=1|S)$ is referred to as the "marginal" (absolute) probability that the token at position i is relevant to the specific question.

The inventors have further recognised that this can be calculated from the probability "by-products" of the CRF 504' itself, i.e. the $P(L|S)$ values determined for every possible label sequence, as:

$$P(l_i = 1 \mid S) = \sum_{L \in \mathbb{L}_i} P(L \mid S)$$

This summation is considered a form of marginalization, hence the marginal probability terminology. The term $\mathbb{L}_i$ denotes the subset of possible label sequences having $l_i=1$ (see below).

Notationally $\mathbb{L} = \{(0,0,0, \ldots, 0), (1,0,0, \ldots, 0), (0,1,0,0, \ldots, 0), (1,1, 0,0, \ldots, 0), \ldots (1,1,1,1, \ldots, 1)\}$ denotes the set of all possible I/O label sequences of length m. The notation $\mathbb{L}_i \subset \mathbb{L}$ denotes the subset of label sequences in $\mathbb{L}$ for which $l_i$ (i.e. the label at position i) is 1. Hence, $\mathbb{L}_1 = \{(1,0,0,0 \ldots), (1,1,0,0, \ldots), (1,0,1,0, \ldots), (1,1, 1,0, \ldots), \ldots\}$ [note the label at position 1 always has a value of 1]

$\mathbb{L}_2 = \{(0,1,0,0 \ldots), (1,1,0,0, \ldots), (0,1,1,0, \ldots), (1,1, 1,0, \ldots), \ldots\}$ [note the label at position 2 always has a value of 1]

$\mathbb{L}_3 = \{(0,0,1,0 \ldots), (1,0,1,0, \ldots), (0,1,1,0, \ldots), (1,1, 1,0, \ldots), \ldots\}$ [note the label at position 3 always has a value of 1], etc.

In order to force an answer, a probability threshold T is defined, and the system attempts to force an answer as follows. First, it identifies the maximum marginal probability of the m marginal probabilities computed for each label sequence. That is, $$P(L_{i'}|S) = \max\{P(l_1=1|S), P(l_2=1|S), \ldots, P(l_m=1|S)\}$$

where i' denotes the token position having the highest marginal probability.

However, an answer will only be forced if the maximum marginal probability meets the defined probability threshold, i.e.

$$P(L_{i'}|S) \geq T$$

If $P(L_{i'}|S) < T$, then the system returns "no answer" for the document in question (answer forcing fails).

The threshold T could be fixed, or dynamic. The threshold T could be learned though structured training, manual tuning, or a combination of both.

However, if $P(L_{i'}|S) \geq T$ then the system returns a forced answer on the basis that at least the token at position i' is relevant (answer forcing succeeds). That is to say, at least token $s_{i'}$ is provided as (part of) an extracted answer if the probability threshold is met, and additional steps may be applied to identify any other relevant tokens.

For example, if a token is identified above the threshold, further steps are involved to check for adjacent tokens which should be included, or multiple answers elsewhere in the text. These stages are dependent on the score of the first identified candidate token, and are selected through further rules (i.e. thresholds). The final list of identified tokens is returned as the answer (forcing the corresponding labels to be 1).

Either way, the answer will comprise the token $s_{i'}$ having the highest marginal probability, provided the probability threshold is met.

As indicated above, in determining the highest label sequence probability P(L|S), the CRF does not necessarily compute the probability of every possible label sequence, but rather determines the highest probability sequence using a version of the Viterbi algorithm to avoid having to compute every permutation.

In this context, i.e. when P(L|S) is not necessarily available for all possible label sequences, the marginal probabilities are calculated through CRF in a manner somewhat analogous to the application of the Viterbi algorithm for finding the highest probability sequence. This process also relies on dynamic programming to avoid computing all possible permutations, whilst still allowing all of the marginals to be calculated. This process comprises applying the forward-backward algorithm to compute the marginals efficiently. The forward-backward algorithm is known in the context of Markov models, and can be applied to CRFs as CRF are based on the Markovian assumption.

Confidence Scoring

Answer forcing may be used to implement a simple but effective confidence tagging mechanism, in which all answers which do not require answer forcing are assigned a high confidence tag, and answers which do require answer forcing are assigned a low confidence tag (irrespective of the success of failure of the answer forcing). Although simple, this has been found to be intuitive to non-technical users, and moreover effective in guiding a non-technical user's training strategy—a relatively high proportion of forced answers (low confidence tags) on a particular question indicates that the prediction reverts to using the marginal probabilities in the majority of cases instead of the full sequence prediction to find an answer (see above). In a common context, in which answers are expected to be present in the majority of cases, this might provide an indication that the corresponding model for that question has not been adequately trained, as the main prediction method (using the full label sequence) fails in returning answers most of the cases.

Answer Table

The answers as found either by the trained model 504' or through answer forcing are inserted into a tabulated format 600, as shown in FIG. 8. The tabulated format 600 resembles the labelling format. Indeed, the first rows may represent the data relating to the documents 100 which were labelled during training.

The user may choose to run the analysis for any one or more of the questions. That is, he can dictate which questions are answered and so determine what information is presented to him in the tabulated format 600. He can also choose different document to be analysed for each different question.

The tabulated format 600 comprises a column representing each of the questions which have been run. The names 102 of the documents which have been analysed, i.e the documents selected by the user in the uploaded document display 500 shown in FIG. 7, are shown in the left-hand column, such that each row of the table represents the data extracted from a single document.

Each cell of the tabulated format 600 comprises the extracted data 606 relating to the corresponding document and question. The trained model generates an answer for populating the appropriate box if it has been able to generate an answer. If it has not, then the system enables an answer to be. If there is more than one answer for a particular question in a single document, all of the generated answers may be presented in the same cell of the table 600.

Each cell also comprises a confidence bar 604. The confidence bars 604 may be presented in different colours, each colour relating to a different confidence level. In the example of FIG. 8, there are three different colours of confidence bar, so three different confidence groups, representing ground truth answers from user highlighting (assumed completely confident), high confidence answers (the highest confidence for inferred answers), and low confidence answers. As noted, an answer is given a high confidence if it is generated by the model, whereas forced answers are given a low confidence. It will be applicated that there may be more or fewer confidence groups into which the generated answers can be divided, and that the confidence groups may be represented to the user in an alternative way.

The overall confidence of the extracted data is presented to the user in a total confidence display 602. This provides the user with information relating to the amount of data which has been extracted from the all of the analysed documents relating to all of the questions which falls within each of the confidence groups. In this example, the user is presented with this information both as a proportional bar chart, where the proportion of the bar chart which is of one colour represents the number of cells with confidence bars 604 of that colour, and as percentages, where the percentage for each confidence group is the percentage of cells with extracted data falling within that confidence group. It will be appreciated that the data may be presented to the user in another format. For example, the user may be presented with a pie chart or a graph comprising the results. Any other suitable representation may be used.

The overall confidence for a single document or for a single question may also be shown to the user, although not shown in the example of FIG. 8.

This can guide a user's training strategy—if a relatively high proportion of answers in a given column of the answer table have low confidence (indicating that answer fording was required), this is a reasonably reliable indication the model specific to that question has not been adequately trained.

Additional UI Capabilities

As discussed with reference to labelling documents 100 above, a single document may contain answers to one or more user defined questions. The user may also identify answers to more than one question within a single document.

Figure 9:
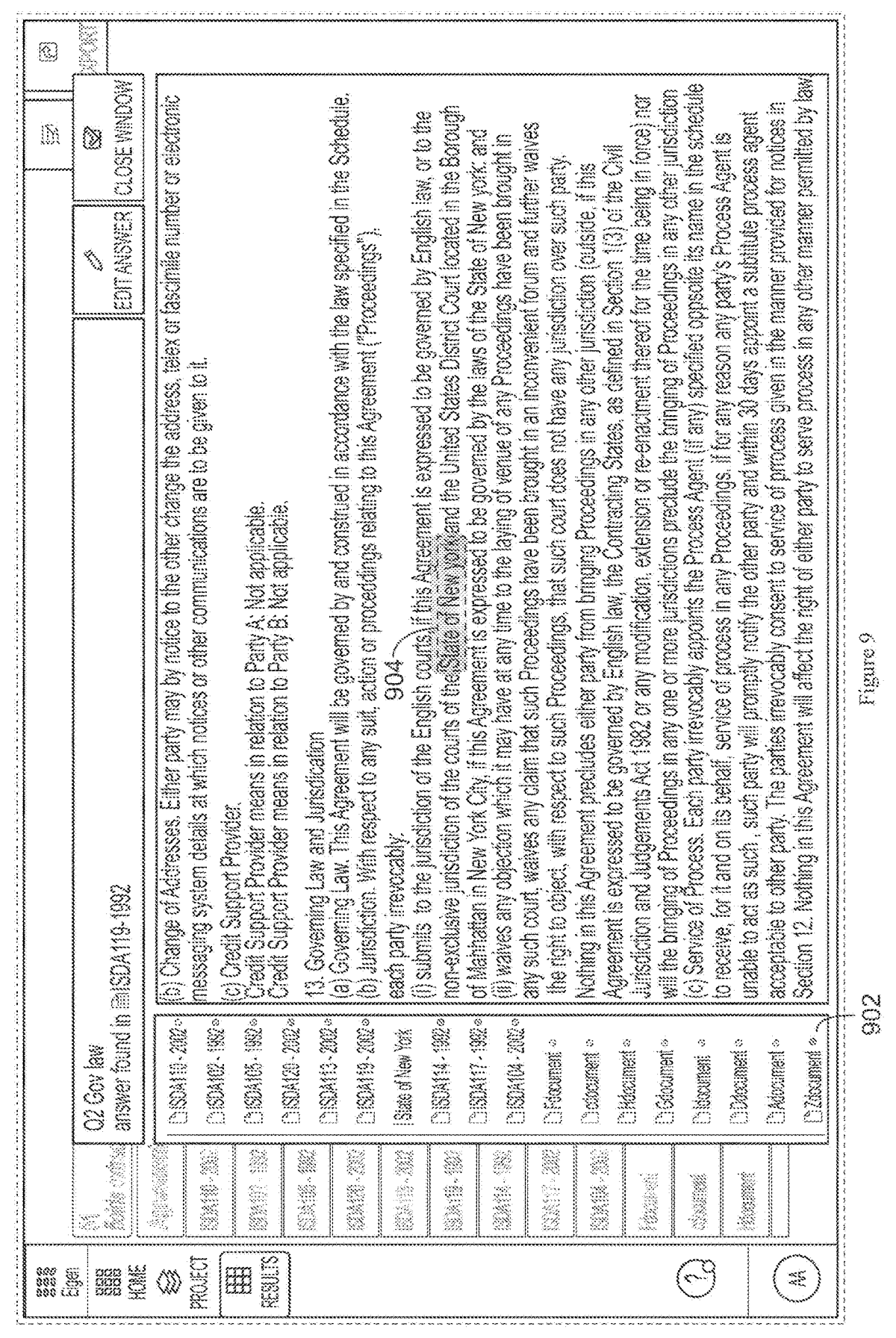

The user may select an answer from the results table 600. This opens the relevant document in a document view, as shown in FIG. 9. The portion of the document presented to the user on the display contains the selected answer. That is, the document has jumped to the answer which the user has selected so that the user can see it within the context it is used. The answer may be highlighted to the user.

In the document view, the user is presented with the document for which the answer was selected, and a list of the other documents which answer the same in a document sidebar 902. The list of documents may also comprise the answers which have been extracted from said documents (not shown in FIG. 9), displayed associated with the document name. The user can select a document from the document sidebar 902. This takes the user to the newly selected document and highlights to the used the answer 904 in said document.

Each answer 904 is associated with an html tag. When a user selects a document or answer in the document sidebar 902 or results table 600, the tokens associated with the question are accessed from a database stored at the Eigen system. The html tags associated with the tokens are also accessed. Using these accessed html tags, the system is able to indicate to the user the location of the answer 904 in the document.

It will be appreciated that a question sidebar 1002 and allowing the user to jump to the relevant parts when a question is selected in the question sidebar 1002 may also be a feature of the labelling display, as shown in FIGS. 1 and 10, as discussed above. This allows the user to easily see where labels have been applied to the document 100.

Through the document view, the user can edit the labels which have been assigned by the model. That is, the user can change the data which has been identified by the model as answering the question. This may be achieved via a similar method to that for labelling document 100 as shown in FIGS. 1 and 10. These user modified answers replace the model generated answers and are saved associated with the document and question for which they are an answer.

Documents which have been analysed by the model are stored as labelled documents, and are shown along with the user labelled documents in the labelled document section of the uploaded document display 500.

When a model is trained, it is "locked" based on the training data it has been trained on. That is, the model cannot be incrementally trained, where the same model is retrained on additional data.

However, it is possible to train a new model to answer the same user defined question using different or additional training documents. For example, the user may choose to train a new model if the results produced by the model are not accurate to a satisfactory level. He can then choose any labelled documents to use to train the new model. These user chosen documents may include one or more user labelled documents, model labelled documents, or documents for which the user has modified model generated labels. This allows the user to introduce new documents into the training set. The model is then trained from scratch using the user selected labelled documents. The previously trained model is discarded.

The user may choose to include in the training set documents which the model has incorrectly labelled. This is known as targeted re-training. Untargeted re-training is also possible, whereby the user selects additional training documents at random, although this may result in more training iterations or more documents in the training set being required to achieve a satisfactory model accuracy.

System Architecture

Figure 13A:
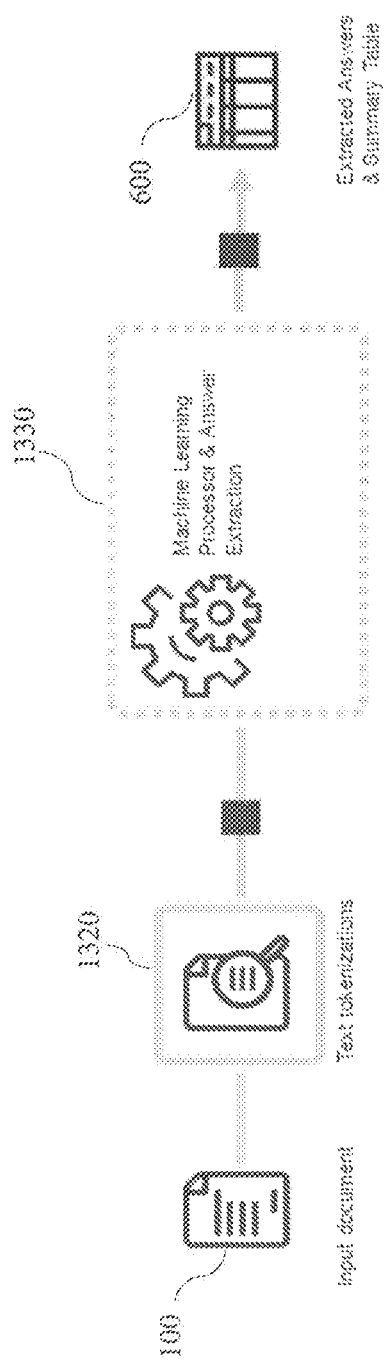
FIG. 13A is a schematic block diagram of an example architecture of the system for analysing documents.
Figure 13B:
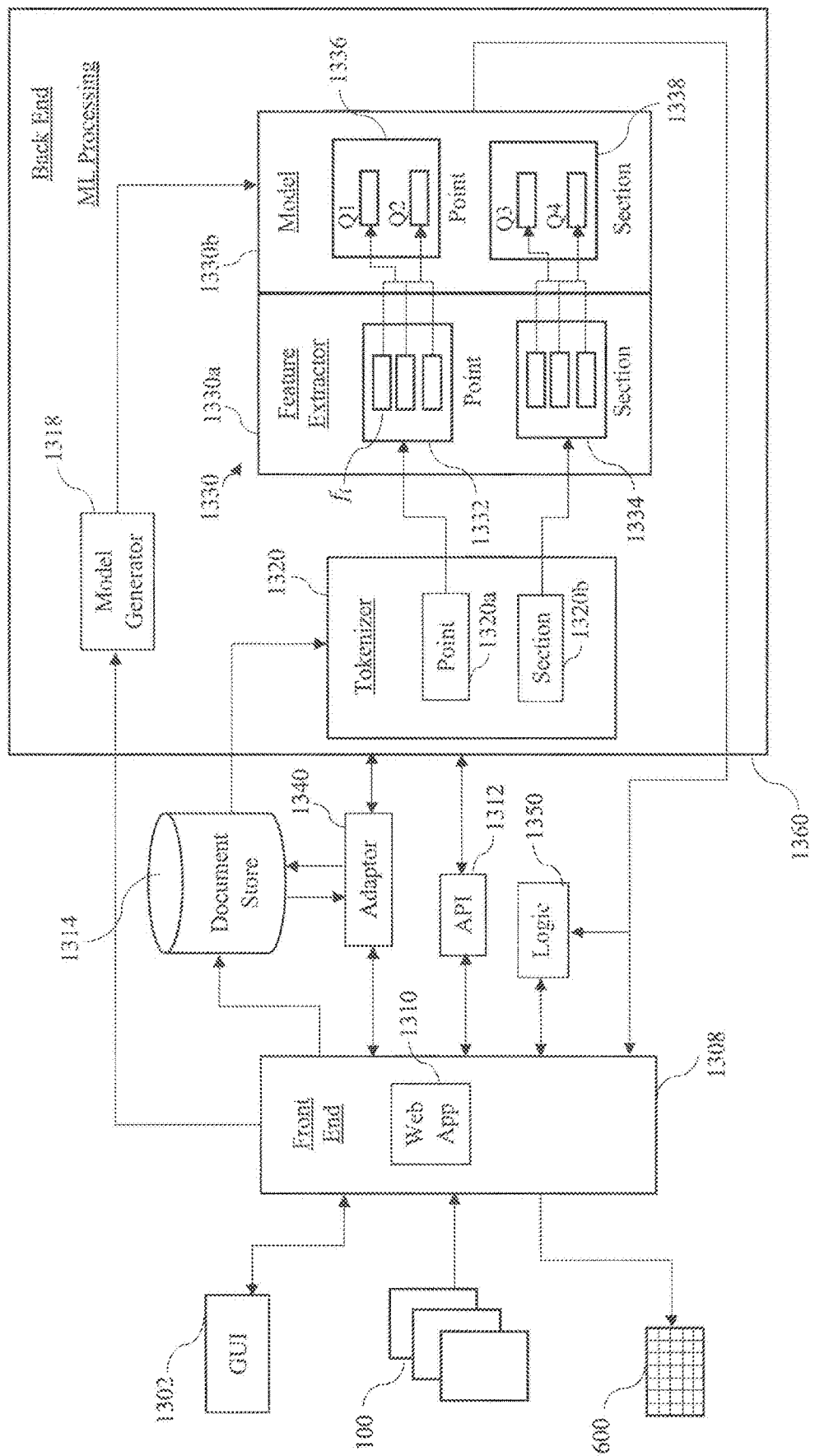
FIG. 13B is a more detailed block diagram of the example architecture of FIG. 13A.

FIG. 13A shows a highly schematic block diagram of an example architecture of the system for analysing documents. FIG. 13B shows a more detailed block diagram of the example architecture.

A user inputs documents 100 into the system via a front end 1308. The front end 1308 provides the user access to the system. This may be provided by a web app (application) 1310. In the above examples, the user interacts with the front end via a graphical user interface (GUI) 1302 of the web app 1310. The user may, for example, use the GUI 1302 during the answer defining process, as illustrated in FIG. 1.

Once the documents 100 have been uploaded via the front end 1308, they are stored in a document store 1314. They may be stored in associated with the project for which they have been uploaded, the user defined document name 102, and/or any other data relating to the document 100, such as the user defined ground truth label sequence or the features evaluated by the model. The uploaded documents 100 may be stored in their unconverted or converted form as applicable. At least one adaptor 1340 is used to convert between the text characters of the underlying documents which are presented to the user at the front end 1308, and the tokens used by for machine learning processing in a back end 1360 of the system. The back end 1360 comprises a tokenizer 1320, a model generator 1318, and a machine learning engine (module) 1330. These modules are described in more detail below.

The user, via the GUI 1302, defines questions and identifies answers, thus defining a ground truth label sequence, L as above. The adaptor 1340 uses the user highlighted parts 104 to assign the correct ground truth label to each token. Each new user defined question causes the model generator 1318, to generate a new, blank CRF model which can be trained and applied for the question using the features and tokenisation applicable to its question type.

A set of point and section extraction models 1330b of the LM engine 1330 is shown, each of which is created in response to a new question of the applicable type.

The text of each document 100 is tokenised by the tokenizer 1320. The tokenizer 1320 comprises separate tokenising modules for each of multiple tokenization schemes, with at least one such scheme for point extraction and at least one other for section extraction. That is, it may comprise a point tokenizer 1320a, which assigns a token to each word of the document, and a section tokenizer 1320*b*, which assigns a token to each chunk of the document. The output of the tokenizer 1320 is at least one sequence of tokens, S, of the document 100, for each document that is tokenised.

The sequence of tokens, S, is sent to a feature extractor component 1330*a* of the machine learning module 1330. The feature extractor component 1330*a* comprises a feature extractor for each question type. In particular, the point extraction tokens from the point tokenizer 1320*a* are processed by a point feature extractor 1332, and the section extraction tokens from the section tokeniser 1320*b* are processed by a section feature extractor 1334. Each of the feature extractors 1332, 1334 applies the feature functions, $f_i$, corresponding to the question type. The feature functions, $f_i$, are evaluated for the question type and the sequence of tokens, S, for each sequence of tokens for which features are needed.

The set of models 1330*b* comprises a set of point extraction models 1336 and a set of section extraction models 1338. The features as evaluated by the feature extraction component 1330*a* are passed to the relevant set of models 1336, 1338. That is, the point features are passed from the point feature extractor 1332 to each model in the set of point extraction models 1336 and the section features are passed from the section feature extractor 1334 to each model in the section extraction model set 1338.

Such tokenisation and feature extraction is applied both to ground truth labelled token sequences for training and unlabelled token sequences for inference as described above.

During analysis, the now-trained models in each set of models 1336, 1338 use the extracted features as found by the feature extractor component 1330*a* to generate the predicted sequence of labels, represented using the above mathematical notation, $\tilde{L}$. This predicted sequence of labels is used to provide an answer in the form of any section tokens being labelled with 1. The answer is passed back to the front end 1308 of the system, where it is used to generate the table of results 600. As described above, the results may be presented to the user in other ways, such as in a document view. Analysis results are presented to the user via the GUI 1302.

The system may also comprise a logic module 1340. The user may define a logic question using the logic defining interface 400, as shown in FIG. 6, via the GUI 1302. The user defined logic question is passed to the logic module 1350 which generates the logic for the associated question. Once the relevant models have extracted answers, those answers are passed as needed to the logic module 1340, which uses the extracted answers to generate answers to logic questions (logic answers). Logic answers are passed to the front end, where they are presented to the user on the GUI 1302.

There may be an API 1312 which acts to connect the front end 1308 and the back end 1360, such that the features of the back end 1306 may be accessed at the front end 1308.

Figure 13C:
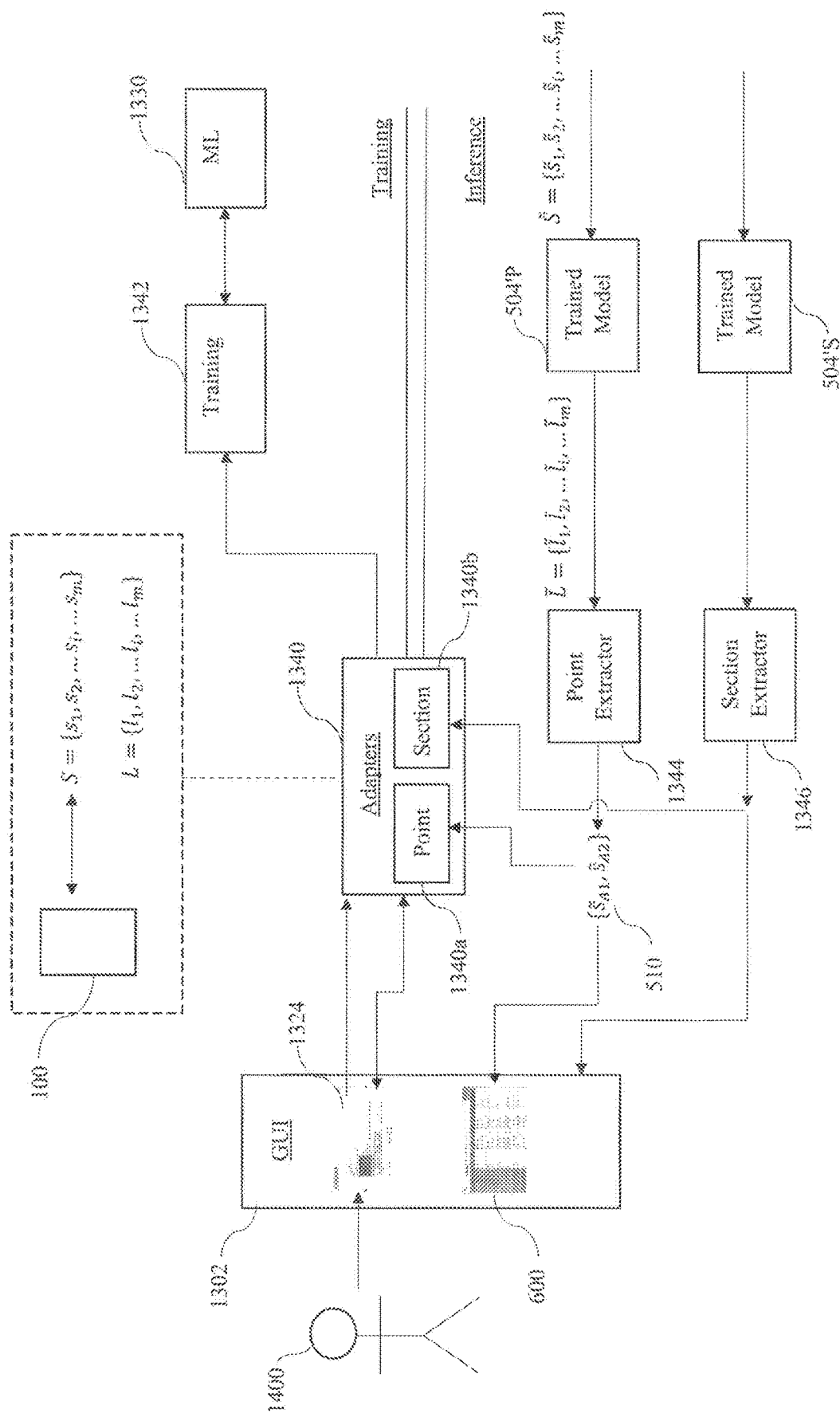
FIG. 13C is a schematic block diagram of use of adapters in the systems described herein.

FIG. 13C shows a schematic block diagram of an example use of adapters in the system described herein. It will be appreciated that the features of FIG. 13C shows additional details which are omitted from the system of FIG. 13B.

During training, the user 1400 uses the GUI 1302 to define question and answers. This may be achieved via a document representation view 1324, such as the user interface described with reference to FIGS. 1 and 10. The document representation view 1324 is also used to present answers in the context of inference.

The adapters 1340 map from characters of training/validation documents to tokens, to allow ground truth labels to be assigned to corresponding token sequences. They also map from tokens to characters of unlabelled documents to allow answers to be presented as highlighted text in the document representation view 1324.

The user identified answers and user uploaded documents are passed to adapters 1340. The adapters 1340 comprise adapters which are specific to a single question type because of the different tokenisation sequences used. In particular, there is a point extraction adapter 1340*a* and a section extraction adapter 1340*b*.

The sequence of tokens, S, and the associated sequence of ground truth labels, L, comprise part of the training data used to train the blank CRF models 504. They are output to a training module 1342, which uses the tokens and ground truth labels from the adapters 1340 and the features evaluated by the feature extractor 1330*a*. This training module 1342 interacts with the machine learning module 1330 to train the blank CRF models 504.

In FIG. 13C, the mathematical notation introduced above is used to distinguish between an inferred label sequence $\tilde{L}$ of an unlabelled token sequence $\tilde{S}$ (i.e. without ground truth labels)—from which answers are extracted and mapped both to document characters in the document representation view 1324, and a ground truth label sequence L of a token sequence S used for training/validation.

The adapters 1340 may also be used during document analysis. User uploaded documents 100 are assigned a sequence of tokens, $\tilde{S}$, by the adapters 1340. These are input into the trained model 504' for the desired question.

FIG. 13C shows two trained models, a point extraction model 504'P and a section extraction model 504'S. The example of FIG. 13C shows the analysis of a document 100 for a point extraction question, but it will be appreciated that the same method may be used for analysing a document for a section extraction question.

The sequence of tokens, $\tilde{S}$, is used by the trained model 504'P, which generates the predicted sequence of labels, $\tilde{L}$. This predicted sequence is used by a point extractor module 1344 which uses the predicted sequence to extract the points 510. The points 510 are the answer(s) to the question for which the model 504'P is trained in the document 100 which has been analysed by the trained model 504'P.

It will be appreciated that there is an equivalent section extractor 1346 which uses the sequence of labels predicted by the section extraction trained model 504'S to extract the sections.

The tokens assigned by the adapters 1340, whether assigned for training or for analysis, are sent through the system augmented with the raw text to which they have been assigned. This removes the requirement for the tokens to be converted back into raw text when being presented to the user in a table format, such as those shown in FIGS. 2 and 8.

The points 510, once extracted by the point extractor 1344, are displayed to the user 1400 on the GUI 1302 in the tabular format 600. As discussed above, this does not require the points 510 to be sent to the adapters 1340.

However, the points 510 are sent to the adapters 1340 in order to display the identified answers in the document representation view 1324, such as the document view shown in FIG. 9. The points 510 are passed to the point adapter of the adapter module 1340, which uses the location of the points in the sequence of tokens, S, to identify the words in the document representation view 1324 to highlight. The adapters 1340 are used in this instance to identify the location of the points in the document 100, for example, by identifying the location of the characters of the points in the string of characters which makes up the document 100.

Figure 14:
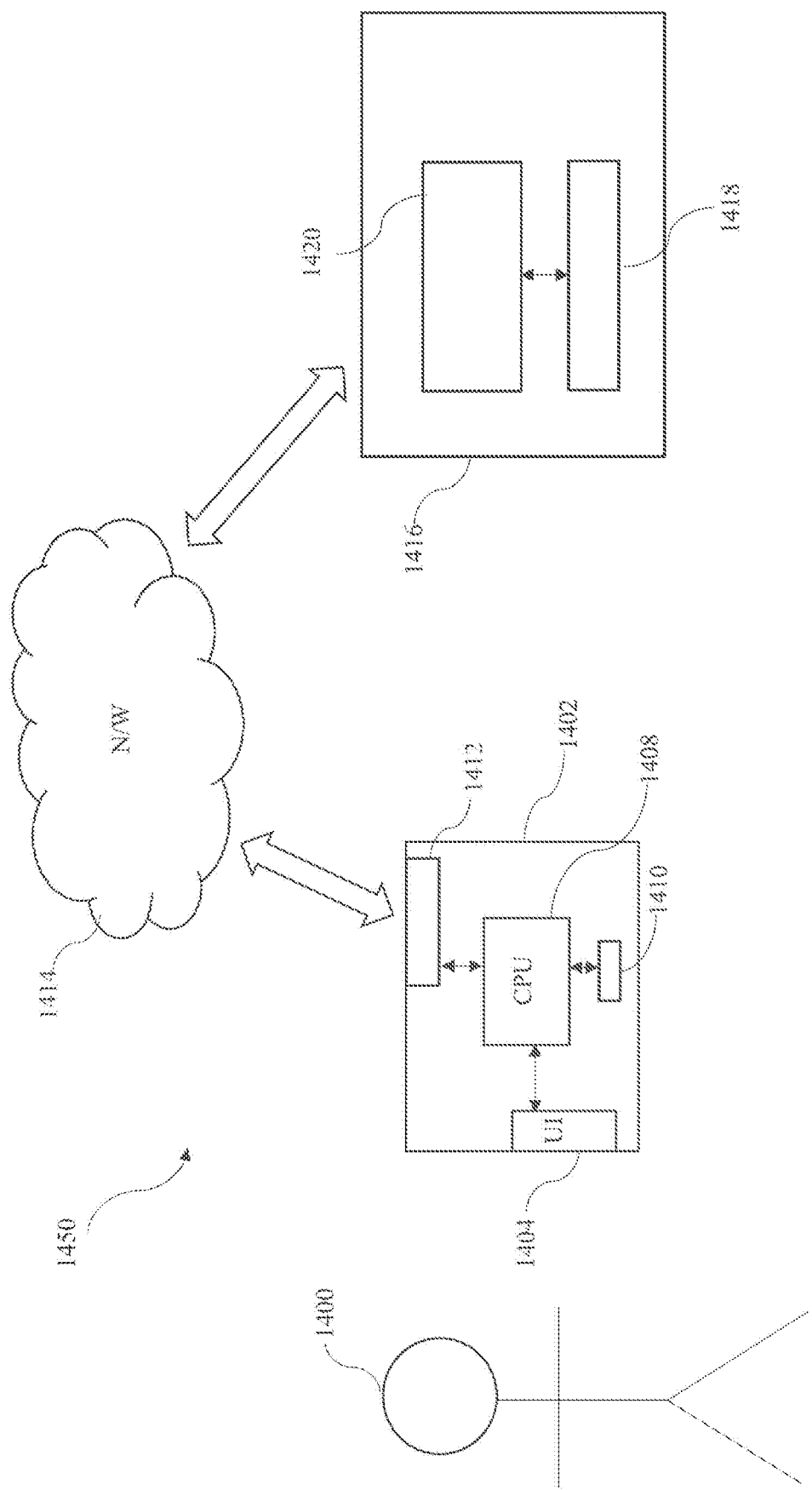
FIG. 14 shows a highly schematic block diagram of a computer system.

FIG. 14 shows a highly schematic block diagram of a computer system 1450 comprising a computer device 1402 at which a user 1400 may upload documents for training or analysis, label the training set, and view any results of the model. The computer device 1402 may, for example, be a user device, for example, a smart phone, tablet, personal computer etc. In this disclosure, the computer device 1402 is referred to as a user device although the relevant description applies to any computer device.

The user device 1402 is shown to further comprise at least one processor 1408 such as a CPU (central processing unit). The CPU may be configured to execute at least one of the processes described above.

The user device 1402 is shown to also comprise a memory 1410 in which computer programs are stored for execution on the processor 1408, along with any associated data.

The user device 1402 also comprises a user interface (UI) 1404 via which user inputs may be received from the user 1400 and information may be outputted to the user 1400. The UI 1404 may, for example, comprise any suitable combination of input and output devices, such as a display and associated touch screen. Other input devices such as keyboards or mice may be used by the user 1400, along with one or more output devices such as a display. The UI 1404 may comprise the GUI 1302. The graphical representation of the uploaded documents and their answers, as well as the user displays for defining questions, are rendered at the UI 1404 at the front end 1308 of the system.

The user device 1402 also comprises a network interface 1412 via which the user device 1402 can connect to a network 1414, such as the Internet. The user device 1402 is able to connect, via the network 1414, to the document analysis system, shown to be implemented at the hardware level of at least one remote server 1416. The remote server comprises at least one processor 1420 for executing computer programs. It also comprises a memory 1418 in which computer programs are stored for execution on the processor 1420 along with any associated data. That is, the functionality of the document analysis system disclosed herein—and depicted in FIGS. 13A-C in terms of its functional components—is implemented on one or more computer processors (e.g. CPUs, GPUs (accelerators etc.) programmed with computer instructions.

In some embodiments, aspects of the above disclosed method are executed by the processor 1408 at the user device 1402, for example, user labelling of documents. Once this data has been collected, it may be sent to the remote server 1416 for further use by the system.

The invention claimed is:

1. A computer system for extracting structured data from unstructured or semi-structured text in an electronic document, the computer system comprising:
    at least one display device;
    at least one user input device;
    at least one memory embodying computer-readable instructions; and
    at least one processor coupled to the at least one display device, the at least one user input device and the at least one memory, the at least one processor configured to execute the computer-readable instructions, which, upon execution, to cause the at least one processor to render a graphical user interface on the at least one display device, the graphical user interface being configured to present to a user a graphical view of the electronic document for use in training multiple data extraction models for the document, each data extraction model associated with a user defined question, wherein the at least one user input device is configured to enable the user to highlight portions of the document within the graphical view of the graphical user interface;
    wherein the graphical user interface is configured to present in association with each highlighted portion an interactive user entry object which presents a menu of question types to a user in a manner to enable the user to select one of the question types, and a field for receiving from the user a question identifier in the form of human readable text; and
    wherein the computer system is configured to use a question identifier received from the user in said field and a question type selected by the user from said menu to select a data extraction model, and use a highlighted portion of the electronic document associated with the question identifier to train the selected data extraction model; and
    wherein the graphical user interface is configured to present graphical views of multiple documents in sequence, to enable the user to highlight portions of each document for use in training the multiple data extraction models; and
    wherein the graphical user interface is configured to present a tabulated format comprising multiple rows and columns, each row having a document identifier of one of the documents and each column having associated therewith one of the questions identifiers, whereby each cell in each row corresponds to one document and one question, and is populated with any highlighted portion or portions of that document associated with that question.

2. The computer system of claim 1, wherein the question types comprise two or more of: a point extraction question type, a section extraction question type and a table extraction question type.

3. The computer system of claim 1, configured to tokenize the text and extract features from the tokenized text in dependence on the selected question type.

4. The computer system of claim 3, wherein the question types comprise two or more of: a point extraction question type, a section extraction question type and a table extraction question type, and wherein a common model type is used for said two or more question types but with different features and tokenization.

5. The computer system of claim 3, configured to assign, for each user defined question, a label to each token of the tokenized text based on any highlighted portion or portions of the text associated with that question, wherein that label is used to train the data extraction model associated with that question.

6. The computer system of claim 1, configured to use the trained data extraction models to extract from unlabelled documents answers to the user defined questions, wherein each answer extracted by each data extraction model comprises or denotes any portion of portions of text determined to be relevant to the question associated with that data extraction model.

7. The computer system of claim 6, wherein an updated tabulated format is presented after training, with additional rows corresponding to the documents from which answers have been extracted by the data extraction models, in which the extracted answers are arranged according to question identifier.

8. The computer system claim 7, configured to enable the user to highlight portions of the text for different questions of different question types in the same electronic document, wherein the row of the tabular format corresponding to said same electronic document contains highlighted portions associated with the different questions of the different question types.

9. The computer system of claim 1, wherein the highlighted portion of each document in each cell is selectable to switch to a view of that document in which that portion is visible and visibly highlighted on the graphical user interface.

10. The computer system of claim 1, wherein the graphical user interface is configured to output a suggested question type for each highlighted portion based on the highlighted portion, wherein the question type is suggested based on a length of the highlighted portion.

11. A computer system for extracting structured data from unstructured or semi-structured text in an electronic document, the system comprising:
  one or more hardware processors configured to execute a plurality of data extraction models, each data extraction model configured to receive training data relating to a user defined question, wherein the user defined question conforms to one of multiple question types;
  wherein the one or more hardware processors are configured to:
  tokenize each electronic document of a document cohort as a sequence of tokens;
  receive, for each of multiple electronic documents of the document cohort, at least one highlighted portion of text for at least one user defined question, wherein the highlighted portion of text has been graphically highlighted by a user as being relevant to that user defined question in a document view of a graphical user interface, and
  provide for each sequenced token of each document a feature value for each of a set of features characterising the token, and a label for each question which indicates if the token is relevant or not relevant to that question based on the at least one graphically highlighted portion of text, the labels being sequenced according to the tokens, and
  train each data extraction model using the feature values and the sequenced labels for a specific user defined question as the training data.

12. The computer system of claim 11, wherein for at least one document, at least two portions are graphically highlighted in respect of at least two of the user defined questions, wherein the at least two questions are of different question types.

13. The computer system of claim 11, wherein each token is a word token or a section token.

14. The computer system of claim 11, wherein at least one of the features is dependent on a candidate label assigned to the token and a candidate label assigned to at least one other token in the sequence.

15. The computer system of claim 14, wherein at least another of the features is dependent on an observation computed for the token and the candidate label of the token but independent of any label of any other token.

16. The computer system of claim 11, wherein each data extraction model is a conditional random field.

17. The computer system of claim 11, configured to train multiple data extraction models for at least one of the user defined questions, and evaluate the trained multiple models in order to select a data extraction model of the multiple data extraction models as trained for that question, wherein the multiple models have different tokenizations, different features, and/or different labelling schemes.

18. Non-transitory media embodying computer-readable instructions configured so as, upon execution by one or more computer processors, to implement operations comprising:
  causing a graphical user interface to present to a user a graphical view of an electronic document for use in training multiple data extraction models for the document, each data extraction model associated with a user defined question, wherein the at least one user input device is configured to enable the user to highlight portions of the document within the graphical view of the graphical user interface, wherein the graphical user interface is configured to present in association with each highlighted portion an interactive user entry object which presents a menu of question types to a user in a manner to enable the user to select one of the question types, and a field for receiving from the user a question identifier in the form of human readable text;
  causing the graphical user interface to output a suggested question type for each highlighted portion based a length of the highlighted portion; and
  using a question identifier received from the user in said field and a question type selected by the user from said menu to select a data extraction model; and
  using a highlighted portion of the electronic document associated with the question identifier to train the selected data extraction model.

* * * * *